(12) United States Patent
Watanabe et al.

(10) Patent No.: US 6,515,804 B2
(45) Date of Patent: Feb. 4, 2003

(54) ZOOM OPTICAL SYSTEM

(75) Inventors: Masahito Watanabe, Hachioji (JP); Hirokazu Konishi, Hachioji (JP); Yuji Miyauchi, Hachioji (JP); Shinichi Mihara, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/813,816

(22) Filed: Mar. 22, 2001

(65) Prior Publication Data

US 2002/0044362 A1 Apr. 18, 2002

(30) Foreign Application Priority Data

May 9, 2000 (JP) .......................................... 2000-135645

(51) Int. Cl.[7] .............................................. G02B 15/14
(52) U.S. Cl. ........................................................ 359/689
(58) Field of Search .................................. 359/683, 689

(56) References Cited

U.S. PATENT DOCUMENTS 6,124,984 A * 9/2000 Shibayama et al. ......... 359/689
6,308,011 B1 * 10/2001 Wachi et al. ................ 359/689

* cited by examiner

*Primary Examiner*—Scott J. Sugarman
(74) *Attorney, Agent, or Firm*—Pillsbury Winthrop LLP

(57) ABSTRACT

A zoom optical system suited for use in an electronic image pickup apparatus comprising a first negative lens unit, a second positive lens unit and a third positive lens unit, in which a magnification is changed from a wide position to a tele position by moving at least the first lens unit and the second lens unit so as to change an airspace between the first lens unit and the second lens unit and widen an airspace between the second lens unit and the third lens unit, the second lens unit comprises a biconvex lens element and a cemented meniscus lens component having a convex surface on the object side, and each lens unit has a small thickness.

24 Claims, 10 Drawing Sheets

ZOOM OPTICAL SYSTEM

BACKGROUND OF THE INVENTION

1. Field of the Invention

The present invention relates to a thin zoom optical system which is suited for use in an electronic image pickup apparatus such as a video camera, a digital camera or the like.

2. Description of the Prior Art

In recent years, digital cameras (electronic cameras) have been attracting attentions as cameras of the next generation which are to take place of silver salt 35 mm film cameras (Leica cameras by a popular name). These digital cameras have several broad categories ranging from high performance cameras for business purposes to portable popular type cameras.

Paying attention to a category of the portable popular type cameras out of these digital cameras, it is strongly demanded to obtain a video camera, a digital camera and the like which provide high quality images and have small depths.

A key point for configuring such a camera so as to have a small thickness in a direction of width lies in shortening a length of an optical system, a zoom optical system in particular, to be used in the camera as measured from a most object side surface to an image surface in a direction of depth.

A main stream has recently been formed by cameras adopting collapsible mount type lens barrels which move optical systems out of camera bodies at a photographing time and accommodate the optical systems into the camera bodies at a carriage time.

However, thicknesses of such cameras adopting the collapsible mount type lens barrels are largely different dependently on types of lens systems and filters used. In case of a zoom optical system in which a most object side lens unit has positive refractive power or the so-called positive lens unit leading type zoom optical system in particular, a thickness of each lens element and a dead space are enlarged in order to enhance specifications such as a zoom ratio, an F number and the like of the zoom optical system. It is impossible to configure a camera to be thin even when the camera uses the collapsible mount type lens barrel like a conventional example disclosed by Japanese Patent Kokai Publication No. Hei 11-258507. In contrast, a negative lens unit leading type zoom lens system which is composed of two lens units or three lens units in particular is advantageous for configuring a camera thin. A zoom lens disclosed by Japanese Patent Kokai Publication No. Hei 11-52246 is known as a conventional example of this type zoom lens system, but the zoom lens system uses lens units each composed of a large number of lens elements which are thick and when a leading lens element is a positive lens element, the zoom lens system does not allow a camera to be configured thin even if the camera is of the collapsible mount type.

Zoom optical systems disclosed by Japanese Patents Kokai Publication No. Hei 11-194274, No. Hei 11-287953 and No. 2000-9997 are known as conventional examples of zoom optical systems which are suited for use with currently known electronic image pickup devices, exhibit favorable imaging performance including zoom ratios, field angles, F numbers and the like, and have possibilities to permit thinning collapsed mounts.

Though it is desirable for thinning first lens units of these conventional zoom optical systems to thin locations of entrance pupils, but it is necessary for thinning the locations of the entrance pupils to enhance magnifications of second lens units. When the magnifications of the second lens units are enhanced, burdens are loaded on the second lens units, thereby making it difficult not only to thin the second lens units but also correct aberrations and undesirably enlarging influences due to manufacturing errors.

Furthermore, a camera can be configured thin and compact by configuring an image pickup device, but when a small image pickup device is to have an identical number of picture elements, the picture elements are arranged at a narrow pitch and a sensitivity becomes insufficient, whereby it is necessary to enhance the sensitivity with an optical system and an influence due to diffraction is produced.

SUMMARY OF THE INVENTION

An object of the present invention is to provide a zoom optical system comprising a first lens unit having negative refractive power, a second lens unit having positive refractive power and a third lens unit having positive refractive power, and configured to change a magnification from a wide position to a tele position by moving at least the first lens unit and the second lens unit so as to vary an airspace between the first lens unit and the second lens unit and widen an airspace between the second lens unit and the third lens unit, wherein the second lens unit comprises, in order from the object side, a biconvex lens element and a cemented meniscus lens component having a convex surface on the object side, and satisfies conditions (1) and (2) mentioned below.

Another object of the present invention is to provide a zoom optical system comprising a first lens unit having negative refractive power, a second lens unit having positive refractive power and a third lens unit having positive refractive power, and configured to change a magnification from a wide position to a tele position by moving at least the first lens unit and the second lens unit so as to vary an airspace between the first lens unit and the second lens unit and widen an airspace between the second lens unit and the third lens unit, wherein the second lens unit comprises, in order from the object side, of a biconvex lens element and a cemented meniscus lens component consisting of a positive meniscus lens element and a negative meniscus lens element, and having a convex surface on the object side, and satisfies the following conditions (1), (2), (3) and (4):

$$1.0 < -\beta 2T < 2.2 \tag{1}$$

$$1.4 < f2/fw < 2.8 \tag{2}$$

$$0.05 < D(2N)/D(2) < 0.2 \tag{3}$$

$$0.2 < R(2R)/f2 < 0.5 \tag{4}$$

DESCRIPTION OF THE PREFERRED EMBODIMENTS

Figure 1:
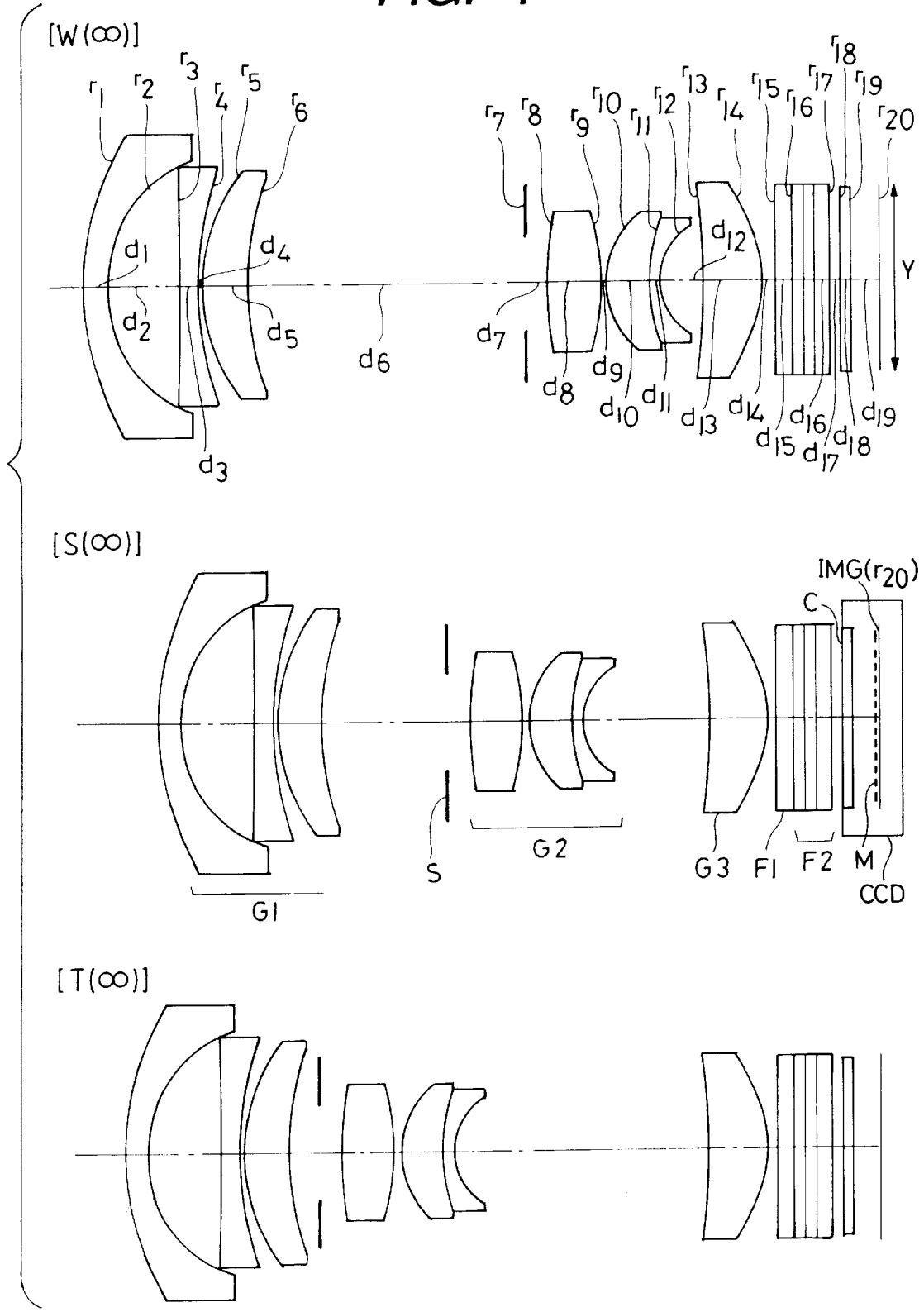
FIG. 1 is a sectional view showing a composition of an optical system according to a first embodiment of the present invention in a condition where the optical system is focused on an object located at infinite distance.

The zoom optical system according to the present invention is an optical system comprising a first lens unit having negative refractive power, a second lens unit having positive refractive power and a third lens unit having positive refractive power, and configured to change a magnification from a wide position to a tele position by moving the above described first lens unit and second lens unit so as to vary an airspace between the first lens unit and the second lens unit and widen an airspace between the second lens unit and the third lens unit, wherein the second lens unit comprises, in order from the object side, a biconvex positive lens element and a cemented meniscus lens component having a convex surface on the object side, and satisfies the following conditions (1) and (2):

$$1.0 < -\beta 2T < 2.2 \tag{1}$$

$$1.4 < f2/fw < 2.8 \tag{2}$$

wherein a reference symbol $\beta 2T$ represents a lateral magnification of the second lens unit at the tele position, a reference symbol $f2$ designates a focal length of the second lens unit and a reference symbol $fW$ denotes a focal length of the zoom optical system as a whole.

The condition (1) defines the lateral magnification of the second lens unit at the tele position. A larger absolute value of the magnification of the second lens unit makes it possible to bring a location of an entrance pupil closer to a first surface of the optical system at the wide position, thereby enabling to reduce a diameter of the first lens unit and thin the first lens unit.

If $\beta 2T$ has a value exceeding a lower limit of 1.0 of the condition (1), the first lens unit will have a large thickness, thereby making it difficult to reduce a thickness in a collapsed condition. If an upper limit of 2.2 of the condition (1) is exceeded, in contrast, it will be difficult to correct aberrations, spherical aberration, coma and astigmatism in particular.

The condition (2) defines the focal length of the second lens unit taking into consideration balance between a thin configuration and correction of aberrations. A smaller value of the focal length f2 of the second lens unit makes it possible to configure the second lens unit itself thinner, but makes it difficult to distribute power so as to locate a front principal point of the second lens unit on the object side and a rear principal point of the first lens unit on the image side and is not preferable from a view point of correction of aberrations.

If f2/fW has a value exceeding a lower limit of 1.4 of the condition (2), it will be difficult to correct aberrations such as spherical aberration, coma and astigmatism. If an upper limit of 2.8 of the condition (2) is exceeded, it will be difficult to configure the second lens unit thin.

In an optical system of the above described type on which a front lens element can hardly have a large diameter, a mechanism is simplified and a dead space is hardly formed in an collapsed condition when an aperture stop is integrated with a second lens unit, for example, by disposing an aperture stop right before a second lens unit and integrating the aperture stop with the second lens unit.

For the optical system to be used in an image pickup apparatus according to the present invention, it is desirable to shorten a moving distance of the third lens unit for a magnification change since such a short moving distance facilitates to locate an exit pupil far while maintaining a favorable image quality.

Furthermore, it is more desirable to satisfy, in place of the above-mentioned condition (1) or (2), the following condition (1—1) or (2-1);

$$1.05 < \beta 2T < 2.0 \tag{1—1}$$

$$1.6 < f2/fW < 2.6 \tag{2-1}$$

Furthermore, it is further desirable to satisfy, in place of the condition (1), (2), (1—1) or (2-1), the following condition (1-2) or (2—2):

$$1.1 < \beta 2T < 1.8 \tag{1-2}$$

$$1.8 < f2/fW < 2.4 \tag{2—2}$$

For the above described zoom optical system according to the present invention, it is preferable to dispose aspherical surfaces on a most object side positive lens element in the second lens unit and in the third lens unit of the zoom optical system.

The aspherical surfaces which are disposed on the most object side lens element of the second lens unit and in the third lens unit preferably make it possible to satisfy two requirements contrary to each other for configuring the optical system thin and favorably correcting aberrations. These aspherical surfaces are preferable since these surfaces make it possible to favorably correct spherical aberration, coma and astigmatism while realizing a thin configuration.

It is preferable to move the third lens unit for focusing the above described zoom optical system to be used in the image pickup apparatus according to the present invention.

In order to maintain favorable aberrations, it is preferable to move the first lens unit in both directions for focusing the above described zoom optical system according to the present invention. From a viewpoint of a mechanism and a thin configuration of the optical system, however, it is desirable to move the third lens unit for focusing. It is desirable to move the third lens unit for both zooming and focusing with power other than that for driving the first lens unit and the second lens unit for zooming. For facilitating to control for movement, it is desirable set the third lens unit so that the lens unit is kept substantially stationary during zooming when the optical system is focused on an object located at infinite distance.

Furthermore it is preferable for the zoom optical system according to the present invention to keep the third lens unit fixed during zooming.

In the above described zoom optical system, the third lens unit is a lens unit which has a diameter larger than that of the second lens unit and is located nearer an image pickup device for a power distribution among the lens units. For simplifying a configuration of an electronic image pickup apparatus as a whole, it is therefore preferable not to move the third lens unit for zooming together with the first lens unit and the second lens unit.

Furthermore, it is preferable to compose the first lens unit of the above described zoom optical system, in order from the object side, of two or fewer negative lens elements and a positive lens element, and configure at least one of the negative lens element so as to have at least an aspherical surface since such an aspherical surface makes it possible to favorably correct aberrations, spherical aberration and astigmatism in particular, in the zoom optical system.

In order to correct aberrations favorably in the above described zoom optical system according to the present invention while maintaining a thin configuration, it is preferable that the cemented lens component of the second lens unit consists, in order from the object side, of a positive meniscus lens element and a negative meniscus lens element, and satisfies the following conditions (3) and (4):

$$0.05 < D(2N)/D(2) < 0.2 \quad (3)$$

$$0.2 < R(2R)/f2 < 0.5 \quad (4)$$

wherein a reference symbol D (2N) represents an axial thickness of the negative cemented meniscus lens component of the second lens unit, a reference symbol D (2) designates a length as measured from an object side surface of the biconvex lens element of the second lens unit to an image side surface of the negative meniscus lens element of the cemented lens component along an optical axis and a reference symbol R (2R) denotes a radius of curvature on a most image side surface of the second lens unit.

The condition (3) defines a thickness of the negative meniscus lens element which is one of the lens elements composing the cemented lens component of the second lens unit or specifies a range within which the thickness of this lens element can be reduced in a condition where astigmatism is maintained favorably.

If D (2N)/D (2) exceeds an upper limit of 0.2 of the condition (3), the lens element will have a large thickness and cannot exhibit an effect for thinning the optical system. If D (2N)/D (2) exceeds a lower limit of 0.05 of the condition (3), in contrast, it will be difficult to correct astigmatism.

The condition (4) defines a radius of curvature on the most image side surface of the second lens unit. If R (2R)/f2 exceeds an upper limit of 0.5 of the condition (4), it will be difficult to correct spherical aberration. If R (2R)/f2 exceeds a lower limit of 0.2 of the condition (4), it will be difficult to correct coma and astigmatism or severe to correct aberrations.

Furthermore, it is desirable to satisfy, in place of the condition (3) or (4), the following condition (3-1) or (4-1):

$$0.06 < D(2N)/D(2) < 1.7 \quad (3\text{-}1)$$

$$0.23 < R(2R)/f2 < 0.4 \quad (4\text{-}1)$$

Furthermore, it is most desirable to satisfy, in place of the condition (3), (4) or the condition (3-1), (4-1), the following condition (4-1) or (4-2):

$$0.07 < D(2N)/D(2) < 1.4 \quad (3\text{-}2)$$

$$0.25 < R(2R)/f2 < 0.35 \quad (4\text{-}2)$$

Furthermore, it is desirable that a shape factor of the second lens unit of the zoom optical system according to the present invention satisfies the following conditions (5) and (6):

$$0.5 < \{R(21F)+R(21R)\}/\{R(21F)-R(21R)\} < 1 \quad (5)$$

$$0.5 < \{R(31F)+R(31R)\}/\{R(31F)-R(31R)\} < 3 \quad (6)$$

wherein reference symbols R (21F) and R (21R) represent radii of curvature on an object side surface and an image side surface respectively of the most object side positive lens element of the second lens unit, and reference symbols R (31F) and R (31R) designate radii of curvature on an object side surface and an image side surface respectively of a most image side positive lens element of the third lens unit.

The condition (5) defines a shape factor of the most object side biconvex lens element of the second lens unit.

If an upper limit of 2 of the condition (5) is exceeded, it will be difficult to correct spherical aberration or if a lower limit of 0.5 of the condition (5) is exceeded, it will be difficult to correct coma. Accordingly, it will be difficult to obtain favorable imaging performance within a practical range when the condition (5) is not satisfied.

Furthermore, the condition (6) defines a shape factor of a positive lens element when the third lens unit is to consists of a positive lens element. If an upper limit of 3 of the condition (6) is exceeded, it will be difficult to correct spherical aberration. If a lower limit of 0.5 of the condition (6) is exceeded, in contrast, it will be difficult to correct coma and astigmatism. That is, it will be difficult to obtain favorable imaging performance within the practical range.

It is more preferable to satisfy, in place of the conditions (5) and (6), conditions (5-1) and (6-1) which are mentioned below.

Furthermore, it is most desirable to satisfy, in place of the conditions (5) and (6) or (5-1) and (6-1), conditions (5-2) and (6-2) mentioned below.

$$-0.4 < \{R(21F)+R(21R)\}/\{R(21F)-R(21R)\} < 0.6 \quad (5\text{-}1)$$

$$0.7 < \{R(31F)+R(31R)\}/\{R(31F)-R(31R)\} < 2.5 \quad (6\text{-}1)$$

$$-0.3 < \{R(21F)+R(21R)\}/\{R(21F)-R(21R)\} < 0.2 \quad (5\text{-}2)$$

$$0.9 < \{R(31F)+R(31R)\}/\{R(31F)-R(31R)\} < 2 \quad (6\text{-}2)$$

When the zoom optical system according to the present invention is to be configured to have a composition in which an image pickup device is disposed on an image surface of the optical system, it is preferable that the first lens unit and the second lens unit satisfy the following condition (7) and condition (8) respectively:

$$0.7 < T1/Y < 1.5 \quad (7)$$

$$0.5 < T2/Y < 1.3 \quad (8)$$

wherein a reference symbol T1 represents a thickness as measured from a most object side surface to a most image side surface of the first lens unit along the optical axis, a reference symbol T2 designates a thickness as measured form a most object side surface of the positive biconvex lens element of the second lens unit to a most image side surface of the cemented lens component of the second lens unit along the optical axis and a reference symbol Y denotes a diagonal length of an effective image pickup area of the image pickup device.

The zoom optical system according to the present invention is to be used in an electronic image pickup apparatus and therefore used in a composition in which an image pickup device is disposed on the image surface of the optical system. In this case, it is desirable to satisfy the conditions (7) and (8).

The above described condition (7) defines a ratio of the total axial thickness of the first lens unit relative to the diagonal length of the image pickup device (nearly rectangular) and the condition (8) defines a ratio of the axial total thickness of the second lens unit relative to the diagonal length of the image pickup device.

If an upper limit of the condition (7) and (8) is exceeded, the first or second lens unit will have a large thickness, thereby making it difficult to configure the optical system thin. If a lower limit of the condition (7) or (8) is exceeded, in contrast, each lens unit most have a long radius of curvature, thereby making it difficult to establish a paraxial relation and correct aberrations.

These conditions (7) and (8) which must be satisfied for obtaining required marginal thicknesses of the lens elements and a space for disposing a mechanism are different dependently on a value of the diagonal length Y of the effective image pickup area of the image pickup device. That is, it is desirable that the condition (7) defines a range specified below dependently on a range of Y as listed below:

(A) for Y<6.2 mm $$0.7 < T1/Y < 1.7 \quad (7\text{-}A)$$

(B) for 6.2 mm<Y<9.2 mm $$0.6 < T1/Y < 1.5 \quad (7\text{-}B)$$

(C) for 9.2 mm<Y $$0.5 < T1/Y < 1.3 \quad (7\text{-}C)$$

When Y has a value within a range (A), (B) or (C) mentioned above, it is similarly desirable that the condition (8) also defines the following ranges (8-A), (8-B) or (8-C):

$$0.5 < T2/Y < 1.5 \quad (8\text{-}A)$$

$$0.4 < T2/Y < 1.3 \quad (8\text{-}B)$$

$$0.3 < T2/Y < 1.1 \quad (8\text{-}C)$$

It is desirable that the optical system according to the present invention having the composition comprising the image pickup device disposed on the image surface of the optical system is configured so as to comprise a filter which is disposed between the optical system and the image pickup device and has a near infrared sharp cut coat having transmittance 80% or higher at a wavelength of 600 nm and 10% or lower at a wavelength of 700 nm.

In an optical system in which an image pickup device is disposed so that the optical system is used in an electronic image pickup apparatus, a near infrared ray absorption filter having a definite thickness is usually disposed on the object side of the image pickup device so that infrared rays will not be incident on an image pickup surface of the image pickup device. This infrared absorption filter must have the definite thickness, thereby thickening the optical system.

The optical system can be configured thin when an infrared cut coat is disposed as described above.

When the above described near infrared ray sharp cut coat is disposed after the zoom optical system and before the image pickup device, the sharp cut coat exhibits transmittance which is higher than that of the infrared absorption filter on a side of red, thereby enhancing a color reproducibility.

For the optical system according to the present invention which comprises the image pickup device, it is desirable to use a complementary color mosaic filter as a filter for coloring the image pickup device.

Figure 10:
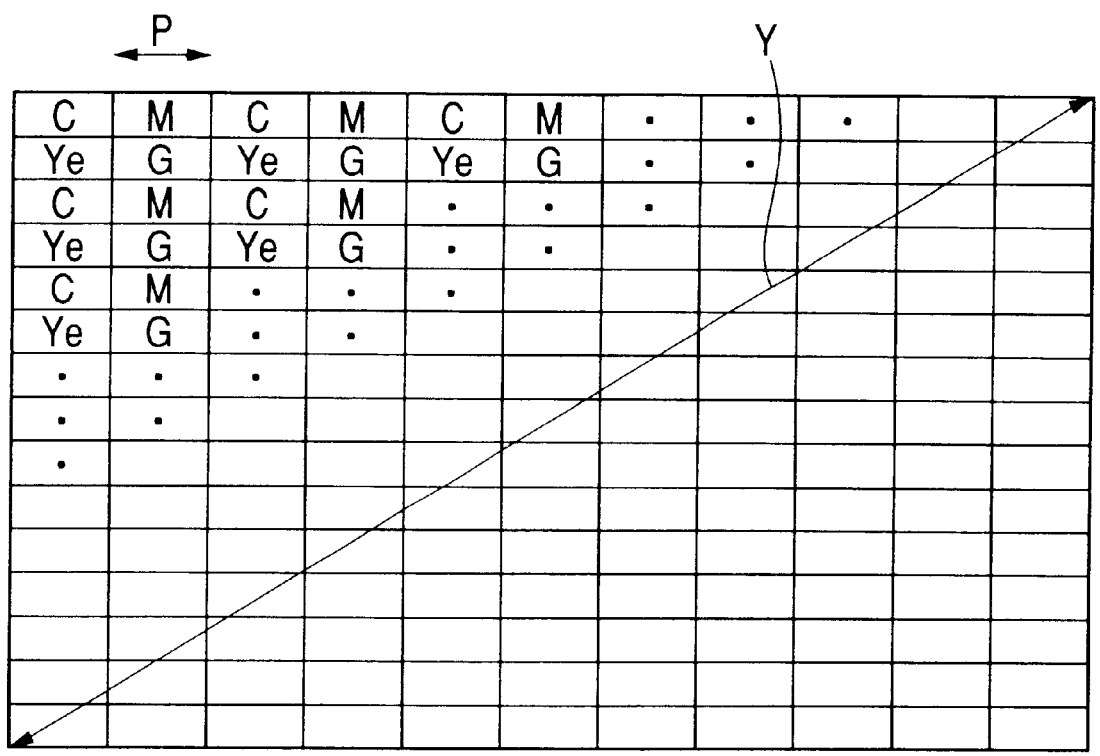
FIG. 10 is a diagram showing an outline of a complementary color mosaic filter to be used in the zoom optical system according to the present invention.

A complementary color mosaic filter to be used in the zoom optical system comprises color filters of cyan, magenta and yellow (C, M and Y) corresponding to complementary colors for primary colors of red, green and blue (G, G and B), and the cyan color filter C, the magenta color filter M and yellow color filter Y are arranged in a mosaic in correspondence to picture elements of the image pickup device as shown in FIG. 10. The color filters are arranged at a pitch which is the same as that of the picture elements of the image pickup device.

Since the complementary color filters enhance energies of rays which have transmitted through the complementary color filters are enhanced, an image pickup device which has the complementary mosaic filters has a sensitivity substantially higher than that of an image pickup device (CCD) having primary color filters and is advantageous from a viewpoint of resolution. Accordingly, the complementary color filters provide a great merit for use of a compact image pickup device.

Furthermore, when the infrared sharp cut coat is used as described above, it is possible by adjusting a gain to moderate a tendency to turn colors on a side of violet into magenta which is a defect of the image pickup device (CCD) having the color mosaic filters, thereby realizing color reproduction equivalent to that available with the image pickup device having the primary color filters.

For the zoom optical system according to the present invention which comprises the above described image pickup device, it is desirable to configure the optical system so as to comprise an optical low pass filter which is disposed on the object side of the image pickup device and satisfy the following condition (9):

$$0.15\, p \times 10^3 < T(LPF) < 0.45\, p \times 10^3 \quad (9)$$

wherein a reference symbol p represents a horizontal pitch of picture elements on the electronic image pickup device and a reference symbol T (LPF) designates a thickness of the optical low pass filter as a whole.

In addition to the infrared cut filter, an optical low pass filter is disposed in the zoom optical system which comprises an electronic image pickup device. The condition (9) defines a thickness of the optical low pass filter.

It is effective for thinning an optical system in a collapsed condition to thin the optical low pass filter, but a moire controlling effect will be lowered by thinning the optical low pass filter.

As the pitch of picture elements is narrower on an image pickup device, on the other hand, contrast of frequency components not lower than a Nyquist limit is lowered under an influence due to diffraction by an imaging optical system, whereby the lowering of the moire controlling effect is moderated and a moire controlling effect is obtained at an allowable degree. It is known that a pretty moire suppressing effect is obtained, for example, when three kinds of filters which have crystallographic axes in azimuths of horizontal (0°) and ±45° directions in a condition where an image is projected to an image surface are used in an overlapped condition. In this case, crystallographic axes deviated p$\mu$m in the horizontal direction and $\sqrt{½}$×p$\mu$m in the 45° direction respectively are known as specifications for thinnest filters. At this time, the filters are approximately $[1+2\times\sqrt{½}]\times p/5.88$ (mm) thick. This is just a specification for zeroing contrast at a frequency corresponding to the Nyquist limit. When the filters are further thinner on the order of several to tens of percents, slight contrast appears at the frequency corresponding to Nyquist limit but can be suppressed owing to the influence due to diffraction.

Other than the filters which have the above described specifications, two filters which are overlapped with each other and an independent filter are usable so far as the filters satisfy the above-mentioned condition (9).

If an upper limit of 0.45 p of the condition (9) is exceeded, the optical low pass filter is too thick, thereby making it difficult to configure the zoom optical system thin. If a lower limit of 0.15 p of the condition (9) is exceeded, moire will be eliminated insufficiently. In this case, it is desirable to arrange the picture elements at a pitch of 5 $\mu$m or narrower.

When the picture elements are arranged at a pitch of 4 $\mu$m or narrower, it is sufficient to satisfy the following condition (9-1):

$$0.13\ p\times10^3 < T(LPF) < 0.42\ p\times10^3 \tag{9-1}$$

Furthermore, in case of (A) through (F) mentioned below, it is desirable to satisfy conditions (9-A) through (9-F) respectively which are mentioned below.

(A) When three optical low pass filters are overlapped and a pitch p is 4 $\mu$m≦p<5 $\mu$m it is desirable to satisfy the following condition (9-A):

$$0.3\ p\times10^3 < T(LPF) < 0.4\ p\times10^3 \tag{9-A}$$

(B) When two optical low pass filters are overlapped and the pitch p is 4 $\mu$m≦p<5 $\mu$m it is desirable to satisfy the following condition (9-B):

$$0.2\ p\times10^3 < T(LPF) < 0.28\ p\times10^3 \tag{9-B}$$

(C) When a single optical low pass filter is used and the pitch p is 4 $\mu$m≦p<5 $\mu$m it is desirable to satisfy the following condition (9-C):

$$0.1\ p\times10^3 < T(LPF) < 0.16\ p\times10^3 \tag{9-C}$$

(D) When three optical low pass filters are overlapped and the pitch p is p<4 $\mu$m it is desirable to satisfy the following condition (9-1):

$$0.25\ p\times10^3 < T(LPF) < 0.37\ p\times10^3 \tag{9-D}$$

(E) When two optical low pass filters are overlapped and the pitch p is p<4 $\mu$m it is desirable to satisfy the following condition (9-B):

$$0.16\ p\times10^3 < T(LPF) < 0.25\ p\times10^3 \tag{9-E}$$

(F) When a single optical low pass filter is used and the pitch p is p<4 $\mu$m it is desirable to satisfy the following condition (9-F):

$$0.08\ p\times10^3 < T(LPF) < 0.14\ p\times10^3 \tag{9-F}$$

An electronic image pickup apparatus which is capable of accomplishing the objects of the present invention can be realized by using the zoom optical system according to the present invention described above and disposing an image pickup device such as a CCD on an image surface of the optical system so as to compose an electronic image pickup device.

Embodiments of the zoom optical system according to the present invention will be described. The embodiments of the present invention have compositions shown in FIG. 1 through FIG. 8 and numerical data which is listed below;

Embodiment 1 f = 4.5 ~ 13.5     F/2.5 ~ F/4.5
$r_1$ = 13.8543
    $d_1$ = 1.0000         $n_1$ = 1.79952         $v_1$ = 42.22
$r_2$ = 6.1958
    $d_2$ = 3.4996
$r_3$ = −171.9549
    $d_3$ = 0.9000         $n_2$ = 1.77250         $v_2$ = 49.60
$r_4$ = 16.0002
    $d_4$ = 0.2000
$r_5$ = 8.3659
    $d_5$ = 2.1000         $n_3$ = 1.84666         $v_3$ = 23.78
$r_6$ = 14.3488
    $d_6$ = $D_1$ (variable)
$r_7$ = ∞ (stop)
    $d_7$ = 1.0000
$r_8$ = 13.2553 (aspherical surface)
    $d_8$ = 2.4895         $n_4$ = 1.58913         $v_4$ = 61.14
$r_9$ = −11.7815
    $d_9$ = 0.3000
$r_{10}$ = 3.9752
    $d_{10}$ = 2.0000      $n_5$ = 1.72916         $v_5$ = 54.68
$r_{11}$ = 8.1724
    $d_{11}$ = 0.5000      $n_6$ = 1.80518         $v_6$ = 25.42
$r_{12}$ = 2.7681
    $d_{12}$ = $D_2$ (variable)
$r_{13}$ = −33.8473
    $d_{13}$ = 2.6465      $n_7$ = 1.58913         $v_7$ = 61.14
$r_{14}$ = −6.2193 (aspherical surface)
    $d_{14}$ = $D_3$ (variable)
$r_{15}$ = ∞
    $d_{15}$ = 0.8000      $n_8$ = 1.51633         $v_8$ = 64.14
$r_{16}$ = ∞
    $d_{16}$ = 1.0000      $n_9$ = 1.54771         $v_9$ = 62.84
$r_{17}$ = ∞
    $d_{17}$ = 0.5000
$r_{18}$ = ∞
    $d_{18}$ = 0.5000      $n_{10}$ = 1.51633      $v_{10}$ = 64.14
$r_{19}$ = ∞
    $d_{19}$ = 1.2000
$r_{20}$ = ∞ (image)
aspherical surface coefficients
(8th surface)    K = 0, $A_2$ = 0, $A_4$ = −4.8156 × 10$^{-4}$
                 $A_6$ = −5.8117 × 10$^{-6}$, $A_8$ = 3.8921 × 10$^{-7}$
                 $A_{10}$ = 2.1239 × 10$^{-8}$
(14th surface)   K = 0, $A_2$ = 0, $A_4$ = 1.3270 × 10$^{-3}$
                 $A_6$ = −6.0317 × 10$^{-5}$, $A_8$ = 3.8903 × 10$^{-6}$
                 $A_{10}$ = −8.4104 × 10$^{-8}$

|       | W (∞)    | S (∞)    | T (∞)    |
|-------|----------|----------|----------|
| $D_1$ | 13.21458 | 6.00621  | 1.51417  |
| $D_2$ | 1.99998  | 5.88825  | 11.91608 |
| $D_3$ | 0.66093  | 0.43631  | 0.48000  |
|       | W (30)   | S (50)   | T (80)   |
| $D_1$ | 13.21458 | 6.00621  | 1.51417  |
| $D_2$ | 1.88057  | 5.66261  | 11.50995 |
| $D_3$ | 0.78034  | 0.66195  | 0.88613  |
|       | W (10)   | S (10)   | T (10)   |
| $D_1$ | 14.60094 | 7.39256  | 2.90053  |
| $D_2$ | 1.99998  | 5.88825  | 11.91608 |
| $D_3$ | 0.66093  | 0.43631  | 0.48000  |

β 2T = −1.545, f2 = 9.3426, fW = 4.5, f2/fW = 2.076
D (2N) = 0.5, D2 = 5.2895, D (2N)/D (2) = 0.0945

-continued

R (2R) = 2.768, R (2R)/f2 = 0.2960,
R (21F) = 13.2553, R (21R) = −11.7815
{R (21F) + R (21R) }/{R (21F) − R (21R) } = 0.0589
R (31F) = −33.8473, R (31R) = −6.2199
{R (31F) + R (31R) }/{R (31F) − R (31R) } = 1.45
T1 = 7.69958, Y = 6.16, T1/Y = 1.250, T2/Y = 0.8587
T (LPF)/p = 0.333 × $10^3$ (p = 3.0 μm, T (LPF) = 1.000 mm)

Embodiment 2 f = 4.51 ~ 12.90    F/2.80 ~ F/5.00
$r_1$ = 21.9050
    $d_1$ = 1.0000    $n_1$ = 1.79952    $v_1$ = 42.22
$r_2$ = 5.4876
    $d_2$ = 1.9041
$r_3$ = 133.8501
    $d_3$ = 0.9000    $n_2$ = 1.79952    $v_2$ = 42.22
$r_4$ = 12.6430
    $d_4$ = 0.2000
$r_5$ = 7.5698
    $d_5$ = 1.5775    $n_3$ = 1.84666    $v_3$ = 23.78
$r_6$ = 19.3947
    $d_6$ = $D_1$ (variable)
$r_7$ = ∞ (stop)
    $d_7$ = 1.0000
$r_8$ = 11.9178 (aspherical surface)
    $d_8$ = 1.6467    $n_4$ = 1.58913    $v_4$ = 61.14
$r_9$ = −11.0083
    $d_9$ = 0.3000
$r_{10}$ = 3.5308
    $d_{10}$ = 1.5734    $n_5$ = 1.72916    $v_5$ = 54.68
$r_{11}$ = 7.2012
    $d_{11}$ = 0.5000    $n_6$ = 1.80518    $v_6$ = 25.42
$r_{12}$ = 2.5388
    $d_{12}$ = $D_2$ (variable)
$r_{13}$ = −24.9058
    $d_{13}$ = 2.0739    $n_7$ = 1.58913    $v_7$ = 61.14
$r_{14}$ = −5.9760 (aspherical surface)
    $d_{14}$ = $D_3$ (variable)
$r_{15}$ = ∞
    $d_{15}$ = 0.8000    $n_8$ = 1.51633    $v_8$ = 64.14
$r_{16}$ = ∞
    $d_{16}$ = 1.0000    $n_9$ = 1.54771    $v_9$ = 62.84
$r_{17}$ = ∞
    $d_{17}$ = 0.5000
$r_{18}$ = ∞
    $d_{18}$ = 0.5000    $n_{10}$ = 1.51633    $v_{10}$ = 64.14
$r_{19}$ = ∞
    $d_{19}$ = 1.2000
$r_{20}$ = ∞ (image)

aspherical surface coefficients
(8th surface)    K = 0, $A_2$ = 0, $A_4$ = −6.2411 × $10^{-4}$
                 $A_6$ = −8.9699 × $10^{-7}$, $A_8$ = −2.7168 × $10^{-8}$
                 $A_{10}$ = 5.6463 × $10^{-9}$
(14th surface)   K = 0, $A_2$ = 0, $A_4$ = 1.3371 × $10^{-3}$
                 $A_6$ = −3.0850 × $10^{-5}$, $A_8$ = 1.0398 × $10^{-9}$
                 $A_{10}$ = 1.5028 × $10^{-7}$

|       | W (∞)    | S (∞)   | T (∞)    |
|-------|----------|---------|----------|
| $D_1$ | 11.05288 | 3.98998 | 1.50000  |
| $D_2$ | 3.00000  | 7.77119 | 12.54234 |
| $D_3$ | 0.50000  | 0.50000 | 0.50000  |
|       | W (20)   | S (20)  | T (20)   |
| $D_1$ | 11.05288 | 3.98998 | 1.50000  |
| $D_2$ | 2.81115  | 7.11225 | 11.23833 |
| $D_3$ | 0.68885  | 1.15894 | 1.80400  |
|       | W (10)   | S (10)  | T (10)   |
| $D_1$ | 12.11212 | 5.04923 | 2.55925  |
| $D_2$ | 3.00000  | 7.77119 | 12.54234 |
| $D_3$ | 0.50000  | 0.50000 | 0.50000  |

β 2T = −1.689, f2 = 8.67, fW = 4.508, f2/fW = 1.92
D (2N) = 0.5, D2 = 4.02, D (2N)/D (2) = 0.1240
R (2R) = 2.5388, R (2R)/f2 = 0.2928,
R (21F) = 11.9178, R (21R) = −11.0083
{R (21F) + R (21R) }/{R (21F) − R (21R) } = 0.0396
R (31F) = −24.9058, R (31R) = −5.976
{R (31F) + R (31R) }/{R (31F) − R (31R) } = 1.63
T1 = 5.582, Y = 5.5, T1/Y = 1.015, T2/Y = 0.7309
T (LPF)/p = 0.333 × $10^3$ (p = 3.0 μm, T (LPF) = 1.000 mm)

-continued

Embodiment 3 f = 4.51 ~ 12.89    F/2.50 ~ F/4.50
$r_1$ = 20.3352
    $d_1$ = 1.0000    $n_1$ = 1.80100    $v_1$ = 34.97
$r_2$ = 6.2998
    $d_2$ = 2.0116
$r_3$ = 300.0000
    $d_3$ = 0.9000    $n_2$ = 1.69350    $v_2$ = 53.21
$r_4$ = 8.4921 (aspherical surface)
    $d_4$ = 0.2000
$r_5$ = 7.2576
    $d_5$ = 1.5641    $n_3$ = 1.80518    $v_3$ = 25.42
$r_6$ = 22.9955
    $d_6$ = $D_1$ (variable)
$r_7$ = ∞ (stop)
    $d_7$ = 1.0000
$r_8$ = 9.8410 (aspherical surface)
    $d_8$ = 1.3962    $n_4$ = 1.58913    $v_4$ = 61.14
$r_9$ = −13.6268
    $d_9$ = 0.3000
$r_{10}$ = 3.6135
    $d_{10}$ = 1.7147    $n_5$ = 1.69680    $v_5$ = 55.53
$r_{11}$ = 7.6098
    $d_{11}$ = 0.5000    $n_6$ = 1.80518    $v_6$ = 25.42
$r_{12}$ = 2.5736
    $d_{12}$ = $D_2$ (variable)
$r_{13}$ = −569.5090
    $d_{13}$ = 1.5368    $n_7$ = 1.58913    $v_7$ = 61.14
$r_{14}$ = −7.3307 (aspherical surface)
    $d_{14}$ = 0.5000
$r_{15}$ = ∞
    $d_{15}$ = 0.8000    $n_8$ = 1.51633    $v_8$ = 64.14
$r_{16}$ = ∞
    $d_{16}$ = 1.0000    $n_9$ = 1.54771    $v_9$ = 62.84
$r_{17}$ = ∞
    $d_{17}$ = 0.5000
$r_{18}$ = ∞
    $d_{18}$ = 0.5000    $n_{10}$ = 1.51633    $v_{10}$ = 64.14
$r_{19}$ = ∞ (image)

aspherical surface coefficients
(4th surface)    K = 0, $A_2$ = 0, $A_4$ = −9.5332 × $10^{-5}$
                 $A_6$ = 1.8422 × $10^{-5}$, $A_8$ = −1.0064 × $10^{-6}$
                 $A_{10}$ = 2.7097 × $10^{-8}$
(8th surface)    K = 0, $A_2$ = 0, $A_4$ = −5.4658 × $10^{-4}$
                 $A_6$ = −2.9677 × $10^{-8}$, $A_8$ = 4.7180 × $10^{-9}$
                 $A_{10}$ = −3.7363 × $10^{-8}$
(14th surface)   K = 0, $A_2$ = 0, $A_4$ = 1.2499 × $10^{-3}$
                 $A_6$ = −6.7022 × $10^{-5}$, $A_8$ = 2.3537 × $10^{-6}$
                 $A_{10}$ = 0

|       | W (∞)    | S (∞)   | T (∞)    |
|-------|----------|---------|----------|
| $D_1$ | 11.76305 | 4.51981 | 2.00000  |
| $D_2$ | 3.00000  | 7.85398 | 12.77399 |
| $D_3$ | 1.16584  | 1.18968 | 1.17178  |
|       | W (10)   | S (10)  | T (10)   |
| $D_1$ | 12.91810 | 5.67486 | 3.15505  |
| $D_2$ | 3.00000  | 7.85398 | 12.77399 |
| $D_3$ | 1.16584  | 1.18968 | 1.17178  |

β 2T = −1.14, f2/fW = 1.971, D (2N)/D (2) = 0.1279
R (2R)/f2 = 0.2890
{R (21F) + R (21R) }/{R (21F) − R (21R) } = −0.1610
{R (31F) + R (31R) }/{R (31F) − R (31R) } = 1.026
T1/Y = 1.007, T2/Y = 0.6933
T (LPF)/p = 0.333 × $10^3$ (p = 3.0 μm, T (LPF) = 1.000 mm)

Embodiment 4 f = 4.50 ~ 12.90    F/2.51 ~ F/4.50
$r_1$ = 18.4649
    $d_1$ = 1.0000    $n_1$ = 1.80100    $v_1$ = 34.97
$r_2$ = 5.7101
    $d_2$ = 2.4859
$r_3$ = 300.0000
    $d_3$ = 0.9000    $n_2$ = 1.69350    $v_2$ = 53.21
$r_4$ = 10.0496 (aspherical surface)
    $d_4$ = 0.2000
$r_5$ = 8.3439
    $d_5$ = 1.8232    $n_3$ = 1.80518    $v_3$ = 25.42
$r_6$ = 33.8392
    $d_6$ = $D_1$ (variable)

-continued $r_7 = \infty$ (stop)
 $d_7 = 1.0000$
$r_8 = 14.7277$ (aspherical surface)
 $d_8 = 2.8383$ $n_4 = 1.58913$ $v_4 = 61.14$
$r_9 = -10.9340$
 $d_9 = 0.3000$
$r_{10} = 4.2185$
 $d_{10} = 2.3364$ $n_5 = 1.69680$ $v_5 = 55.53$
$r_{11} = 9.1355$
 $d_{11} = 0.5000$ $n_6 = 1.84666$ $v_6 = 23.78$
$r_{12} = 2.9663$
 $d_{12} = D_2$ (variable)
$r_{13} = -2.427 \times 10^4$ (aspherical surface)
 $d_{13} = 1.7314$ $n_7 = 1.58913$ $v_7 = 61.14$
$r_{14} = -7.2250$
 $d_{14} = D_3$ (variable)
$r_{15} = \infty$
 $d_{15} = 0.8000$ $n_8 = 1.51633$ $v_8 = 64.14$
$r_{16} = \infty$
 $d_{16} = 1.0000$ $n_9 = 1.54771$ $v_9 = 62.84$
$r_{17} = \infty$
 $d_{17} = 0.5000$
$r_{18} = \infty$
 $d_{18} = 0.5000$ $n_{10} = 1.51633$ $v_{10} = 64.14$
$r_{19} = \infty$ (image)
aspherical surface coefficients
(4th surface) $K = 0, A_2 = 0, A_4 = -2.6055 \times 10^{-4}$
 $A_6 = 2.4879 \times 10^{-5}, A_8 = -1.7356 \times 10^{-6}$
 $A_{10} = 3.7237 \times 10^{-8}$
(8th surface) $K = 0, A_2 = 0, A_4 = -4.8239 \times 10^{-4}$
 $A_6 = -1.3488 \times 10^{-7}, A_8 = 3.7095 \times 10^{-7}$
 $A_{10} = -3.4605 \times 10^{-8}$
(13th surface) $K = 0, A_2 = 0, A_4 = -7.4700 \times 10^{-4}$
 $A_6 = 1.3414 \times 10^{-6}, A_8 = -9.1025 \times 10^{-9}$
 $A_{10} = -1.7156 \times 10^{-9}$

| | W (∞) | S (∞) | T (∞) |
|---|---|---|---|
| $D_1$ | 12.84927 | 4.77463 | 2.00000 |
| $D_2$ | 3.00000 | 8.12568 | 13.33737 |
| $D_3$ | 0.50000 | 0.50000 | 0.50000 |
| | W (30) | S (30) | T (30) |
| $D_1$ | 12.84927 | 4.77463 | 2.00000 |
| $D_2$ | 2.88472 | 7.71584 | 12.49821 |
| $D_3$ | 0.61528 | 0.90984 | 1.33916 |

$\beta\ 2T = -1.13, f2/fW = 2.133,$
$D\ (2N)/D\ (2) = 0.0837, R\ (2R)/f2 = 0.3094$
$\{R\ (21F) + R\ (21R)\}/\{R\ (21F) - R\ (21R)\} = 0.1480$
$\{R\ (31F) + R\ (31R)\}/\{R\ (31F) - R\ (31R)\} = 1.000$
$T1/Y = 1.137, T2/Y = 1.059$
$T\ (LPF)/p = 0.333 \times 10^3\ (p = 3.0\ \mu m, T\ (LPF) = 1.000\ mm)$ wherein reference symbols $r_1, r_2, \ldots$ represent radii of curvature on respective lens surfaces, reference symbols $d_1, d_2, \ldots$ designate thicknesses of respective lens elements, reference symbols $n_1, n_2, \ldots$ denote refractive indices of the respective lens elements, and reference symbols $v_1, v_2, \ldots$ represent Abbe's numbers of the respective lens elements. In the numerical data, lengths such as $r_1, r_2, \ldots$ and $d_1, d_2, \ldots$ are specified in a unit of nm.

Furthermore, reference symbols E(∞), S(∞) and T(∞) represent a wide position, an intermediate focal length and a tele position respectively when the zoom optical system is focused on an object located at an infinite distance, reference symbols W (10), S (10) and T (10) designate a wide position, an intermediate focal length and a tele position when the zoom optical system is focused on an object located at a distance of 10 cm, reference symbols W (30), S (30) and T (30) denote a wide position, an intermediate focal length and a tele position when the zoom lens system is focused on an object located at a distance of 30 cm a reference symbol S (50) represents an intermediate focal length when the zoom optical system is focused on an object located at a distance of 50 cm, and a reference symbol T (80) designates a tele position when the zoom lens system is focused on an object located at a distance of 80 cm.

Figure 2:
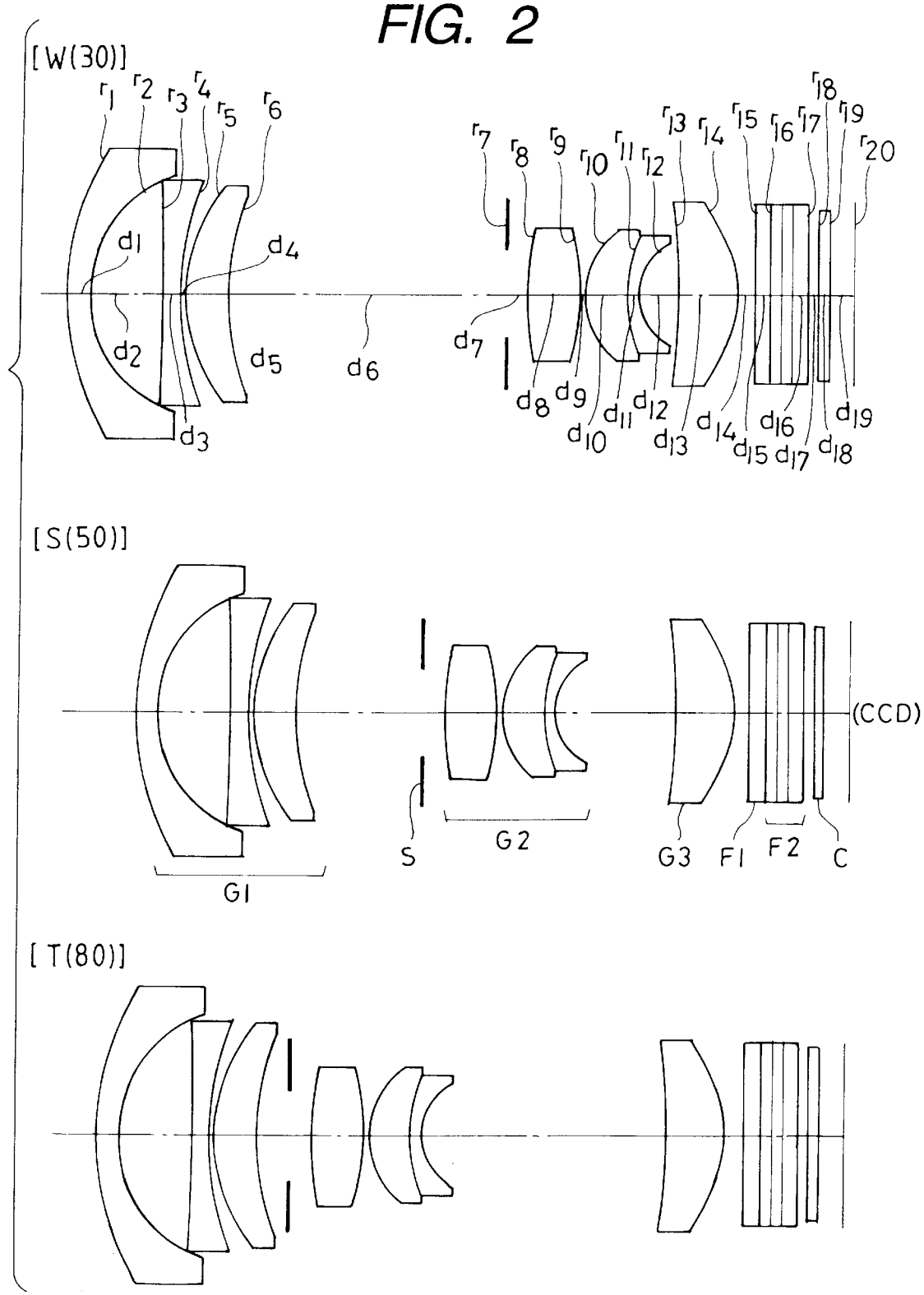
FIG. 2 is a sectional view showing a composition of the optical system according to the first embodiment in a condition where the optical system is focused on an objected located at a short distance.

The zoom optical system according to the first embodiment has a composition shown in FIG. 2, comprises a first lens unit G1 having negative refractive power, a second lens unit G2 having positive refractive power and a third lens unit having positive refractive power, and changes a magnification from a wide position to a tele position by moving the first lens unit G1 and the second lens unit G2 so as to widen an airspace between the second lens unit G2 and the third lens unit G3.

Furthermore, the first lens unit G1 comprises, in order from the object side, a negative meniscus lens element, a biconcave lens element and a positive meniscus lens element, the second lens unit G2 comprises, in order from the object side, a biconvex lens element and a negative cemented meniscus lens component consisting of a positive meniscus lens element and a negative meniscus lens element, and the third lens unit G3 comprises a positive lens element.

To first embodiment satisfies the conditions (1) through (9).

Furthermore, the zoom optical system according to the first embodiment is focused by moving the third lens unit on the object side.

FIG. 2 shows some conditions where the zoom optical system is focused as described above and the zoom optical system can be focused, for example, on an object located at a distance of 30 cm at the wide position as shown in [W (30)] of FIG. 2 by moving the third lens unit G3 approximately 0.12 mm on the object side in a condition of [W (∞)] shown in FIG. 1.

Furthermore, the zoom optical system can be focused on an object located at a distance of 50 cm a shown in [S (50)] of FIG. 2 by moving the third lens unit G3 approximately 0.23 mm on the object side in a condition where the zoom optical system is focused on an object located at an infinite distance at an intermediate focal length as shown in [S (∞)] of FIG. 1 and further on an object located at a distance of 80 mm as shown in [T (80)] of FIG. 2 by moving the third lens unit G3 approximately 0.41 mm on the object side in a condition where the zoom optical system is focused on the object located at the infinite distance (condition of [T (∞)] in FIG. 1).

Furthermore, the optical system according to the first embodiment can be focused on an object located at an extremely short distance of 10 cm. By moving the first lens unit G1 1.386 mm on the object side in a condition of [W (∞)], [S (∞)] or [T (∞)] shown in FIG. 1, for example, the zoom optical system can be focused on the object located at the extremely short distance of 10 cm in a zoom region between the wide position and the tele position.

Figure 3:
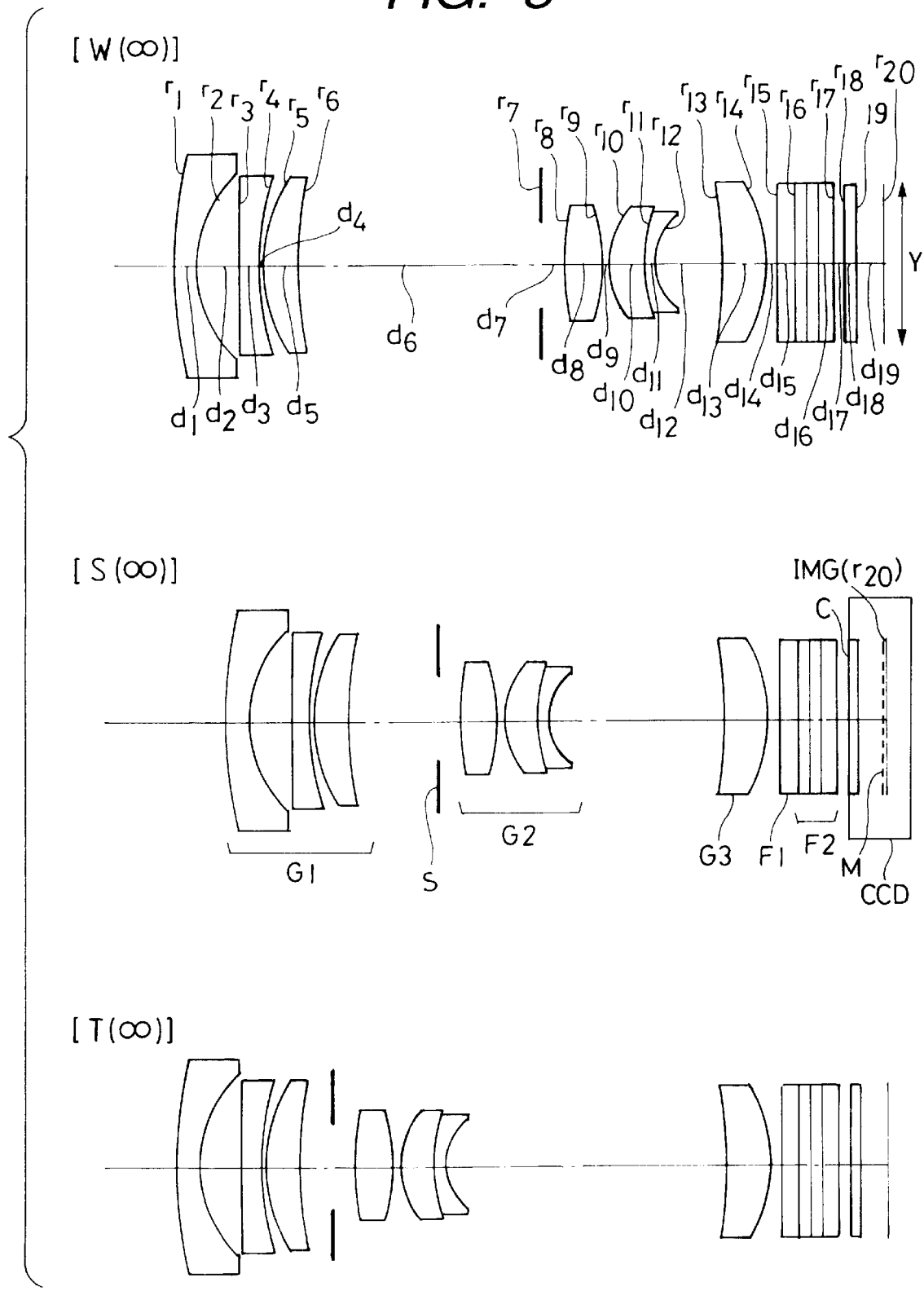
FIG. 3 is a sectional view showing a composition of an optical system according to a second embodiment of the present invention in a condition where the optical system is focused on the object located at the infinite distance.
Figure 4:
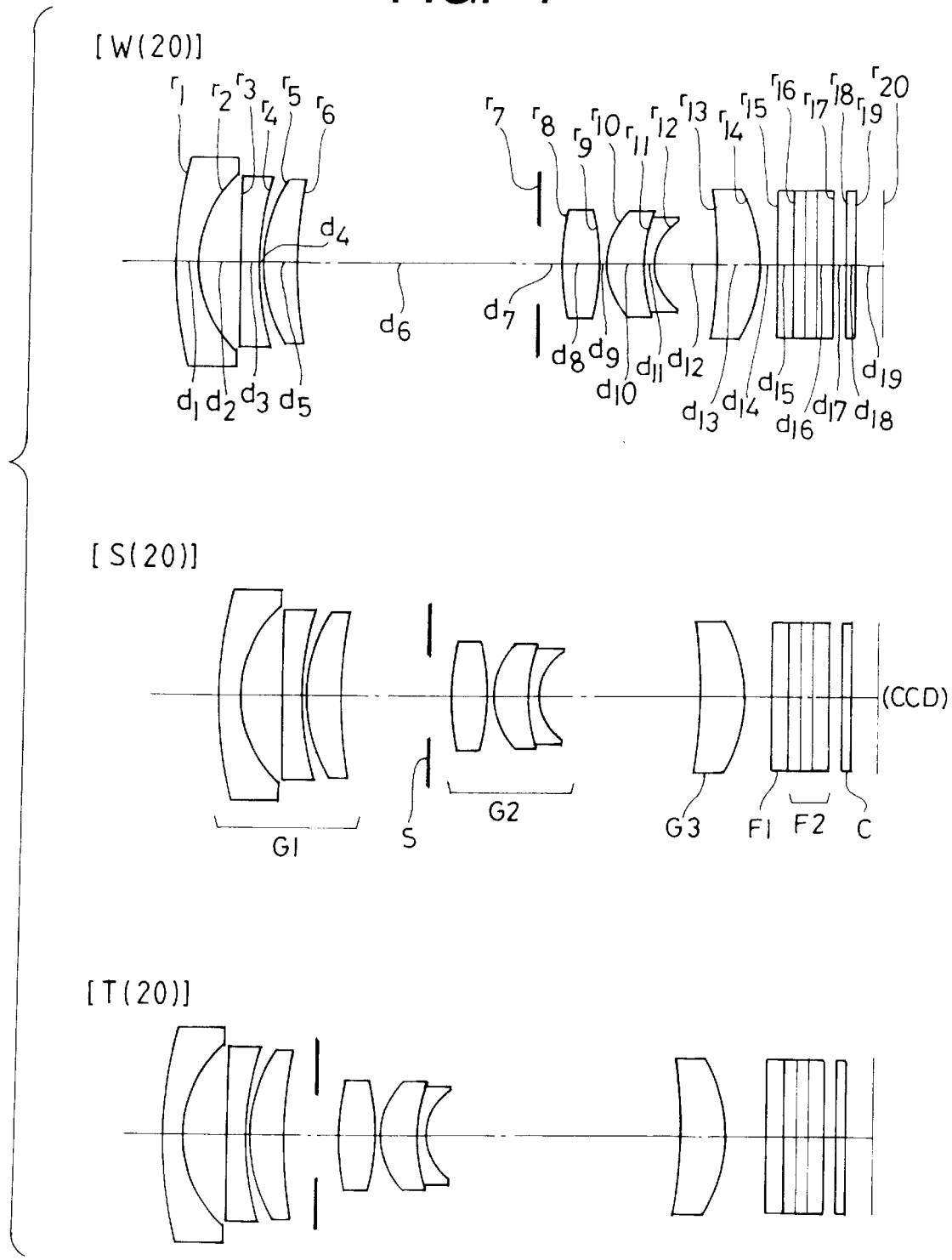
FIG. 4 is a sectional view showing a composition of the optical system according to the second embodiment in a condition where the optical system is focused on the object located at the short distance.
Figure 5:
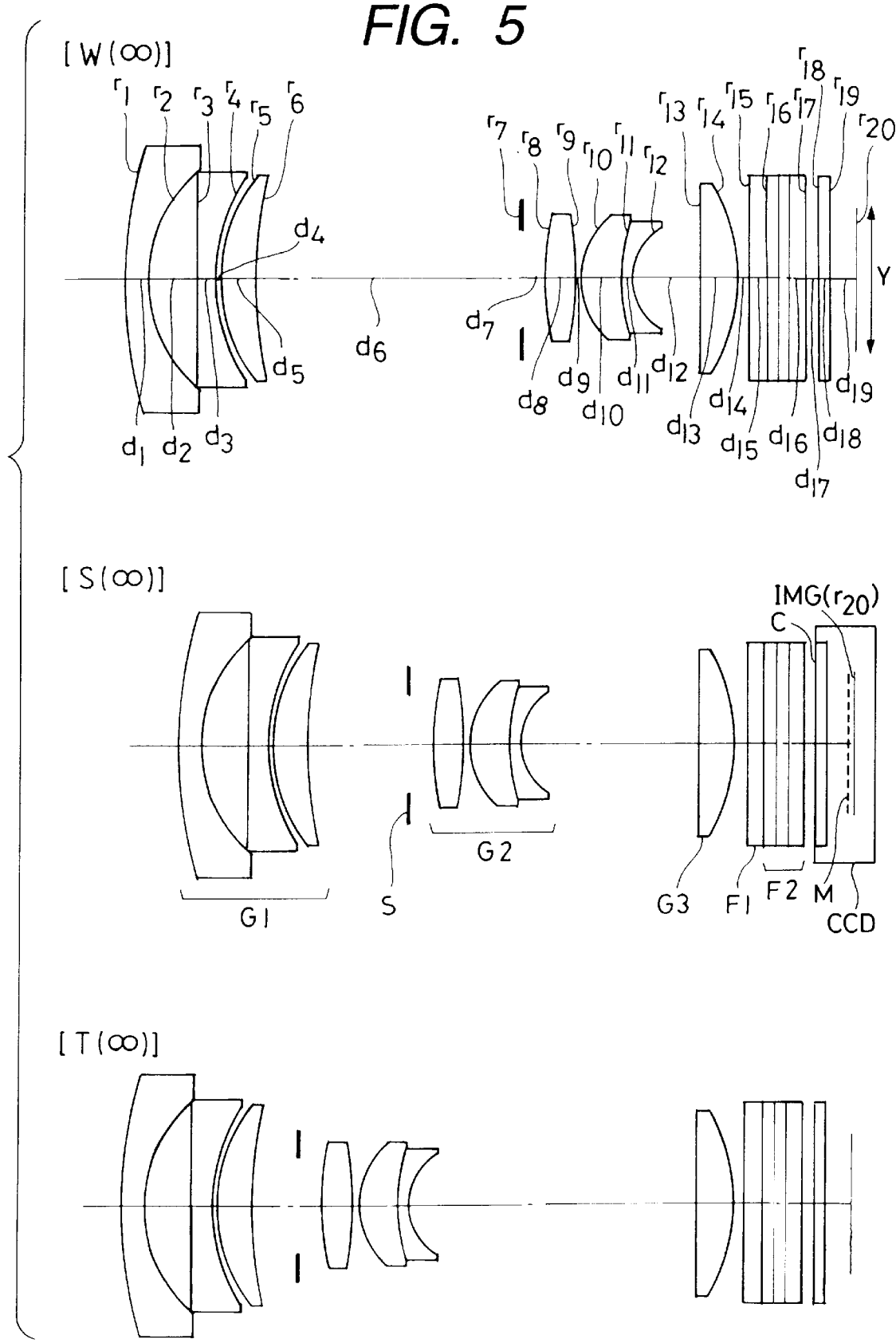
FIG. 5 is a sectional view showing a composition of an optical system according to a third embodiment of the present invention in a condition where the optical system is focused on the object located at the infinite distance.

The zoom optical system according to the second embodiment has a composition shown in FIG. 3, and comprises a first positive lens unit G1, a second positive lens unit G2 and a third negative lens unit G3.

The first, second and third lens units G1, G2 and G3 in the second embodiment have compositions which are similar to those in the first embodiment.

The second embodiment satisfies the conditions (1) through (9).

The second embodiment is focused on an object located at a short distance also by moving the third lens unit G3 on the object side. The zoom optical system can be focused on an object located at a distance of 20 cm by moving the third lens unit G3 approximately 0.19 mm, approximately 0.66 mm or approximately 1.30 mm on the object side, for example, in a condition where the zoom optical system is focused on an object located at an infinite distance at a wide position [W (∞)], an intermediate focal length [S (∞)] or a tele position [T (∞)] shown in FIG. 3. That is, [W (20)], [S (20)] and [T (20)] shown in FIG. 4 correspond to conditions where the zoom optical system is focused on the object located at the distance of 20 cm at a wide position, an intermediate focal length and a tele position respectively.

Furthermore, the optical system according to the second embodiment can be focused on an object located at an extremely short distance of 10 cm by moving the first lens unit G1 approximately 1.06 mm on the object side in a condition of [W (∞)], [S (∞)] or [T (∞)] shown in FIG. 3. That is, the zoom optical system can be focused on the object located at the distance of 10 cm by moving the first lens unit G1 approximately 1.06 mm on the object side in the condition where the zoom optical system is focused on the object located at the infinite distance in an entire vari-focal region from the wide position to the tele position.

The zoom optical system according to the third embodiment has a composition shown in FIG. 3, and comprises a first positive lens unit, a second positive lens unit and a third negative lens unit which have compositions similar to those in the first embodiment.

The third embodiment satisfies the conditions (1) through (9).

The optical system according to the third embodiment is configured for focusing by moving a front lens (the first lens unit G1) on the object side.

That is, the optical system according to the third embodiment can be focused by moving the first lens unit G1 in each zoom condition and can be focused on an object located at an extremely short distance of 10 cm by moving the first lens unit G1 approximately 1.16 mm on the object side in a condition where the zoom optical system is focused on an object located at an infinite distance in an entire vari-focal region from a wide position to a tele position.

Figure 6:
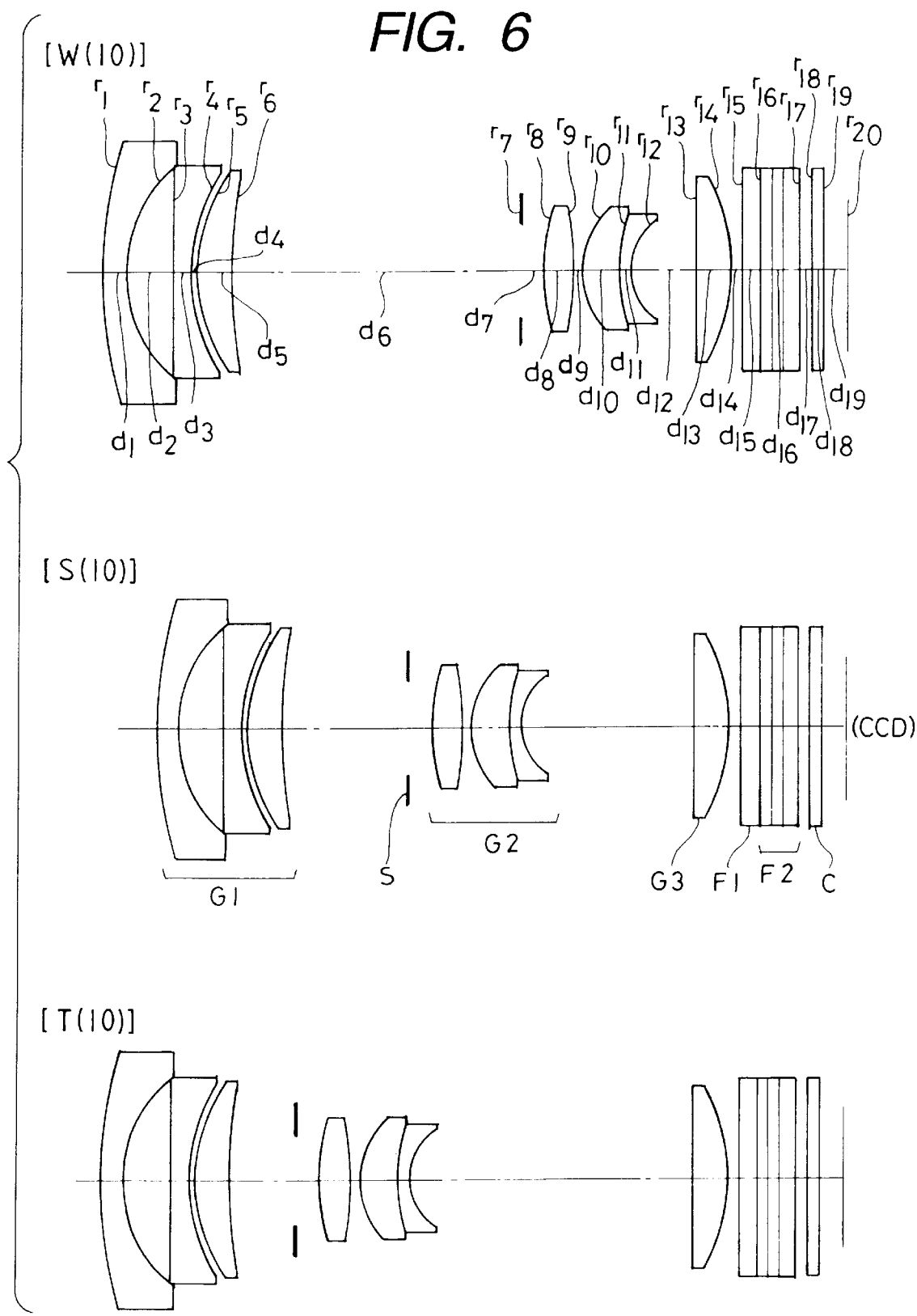
FIG. 6 is a sectional view showing a composition of an optical system according to the third embodiment in a condition where the optical system is focused on the object located at the short distance.

FIG. 6 shows a condition where the optical system according to the third embodiment is focused on the object located at the distance of 10 cm. In FIG. 6, [W (10)], [S (10)] and [T (10)] correspond to conditions where the optical system is focused on the object located at the distance of 10 cm at the wide position, an intermediate focal length and the tele position respectively, and the first lens unit G1 is moved approximately 1.16 mm on the object side in the conditions of [W (∞)], [S (∞)] and [T (∞)] shown in FIG. 5 where the optical system is focused on an object located at the infinite distance.

Figure 7:
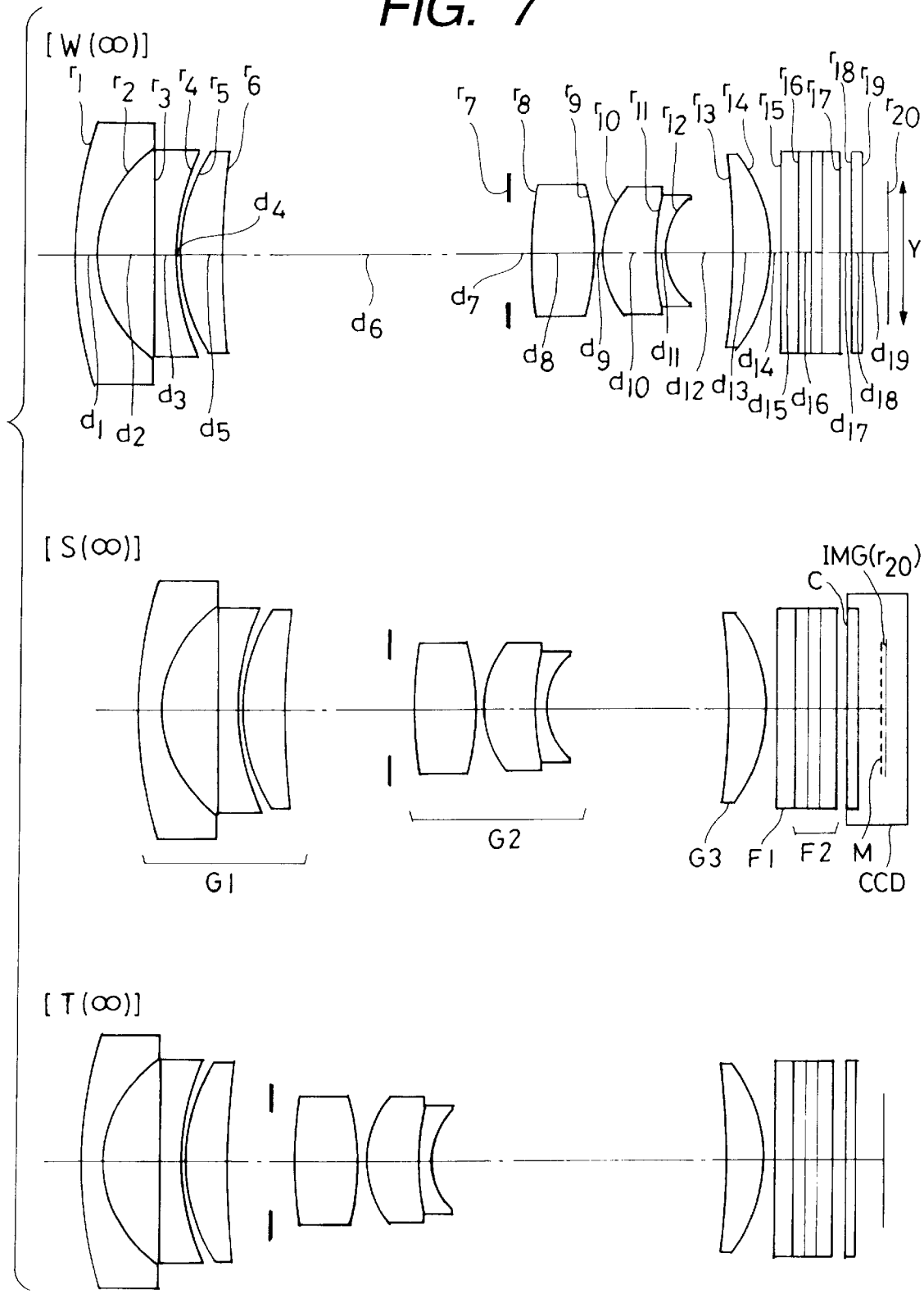
FIG. 7 is a sectional view showing a composition of an optical system according to a fourth embodiment in a condition where the optical system is focused on the object located at the infinite distance.

The fourth embodiment has a composition shown in FIG. 7, and comprises a first lens unit G1 having negative refractive power, a second lens unit G2 having positive refractive power and a third lens unit having positive refractive power, each of which has a composition similar to that in the other embodiments.

The fourth embodiment also satisfies the conditions (1) through (9).

The fourth embodiment is configured to be focused by moving the third lens unit G3.

Figure 8:
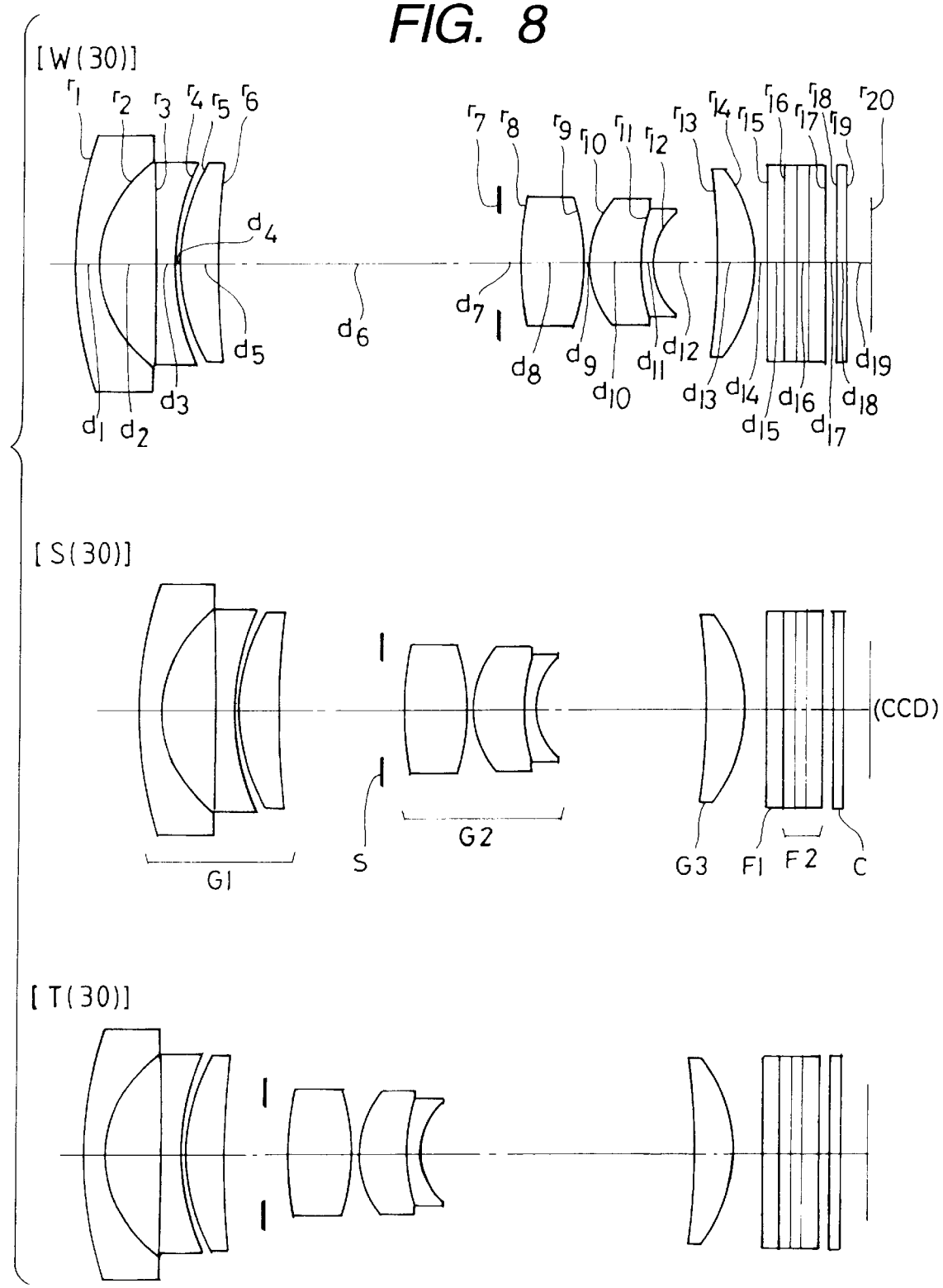
FIG. 8 is a sectional view showing a composition of the optical system according to the fourth embodiment in a condition where the optical system is focused on the object located at the short distance.

FIG. 8 shows a condition where the optical system according to the fourth embodiment is focused on an object located at a distance of 30 cm by moving the third lens unit G3. That is, [W (30)] of FIG. 8 is a diagram which shows a condition where the optical system is focused on the object located at the distance of 30 cm by moving the third lens unit G3 approximately 0.12 mm on the object side in a condition of [W (∞)] shown in FIG. 7 where the optical system is focused on an object located at an infinite distance at a wide position, [S (30)] of FIG. 8 is a similar diagram which shows a condition where the optical system is focused on the object located at the distance of 30 cm by moving the third lens unit G3 approximately 0.41 mm on the object side in a condition of [S (∞)] shown in FIG. 7 and [T (∞)] of FIG. 8 is a diagram which shows a condition where the optical system is focused on the object located at the distance of 30 cm by moving the third lens unit G3 approximately 0.84 mm on the object side in a condition of [T (∞)] shown in FIG. 7.

In the sectional view showing the compositions of the above described embodiments, a reference symbol F1 represents a near infrared filter having a near infrared cut coat and a reference symbol F2 designates an optical low pass filter. The low pass filter has a cemented composition consisting of three filters 0.3 mm, 0.3 mm and 0.4 mm thick respectively.

Out of the above described embodiments, each of the first and second embodiments uses aspherical surfaces as the eighth surface ($r_8$) and the fourteenth surface ($r_{14}$), the third embodiment uses aspherical surfaces as the fourth surface ($r_{14}$), the eighth surface ($r_8$) and the fourteenth surface ($r_{14}$), and the fourth embodiment uses aspherical surfaces as the fourth surface ($r_4$), the eighth surface ($r_8$) and the thirteenth surface ($r_{13}$).

Shapes of these aspherical surfaces are expressed by the following formula:

$$x = \frac{y^2/r}{1+\sqrt{1-(1+K)(y/r)^2}} + A_2 y^2 + A_4 y^4 + A_6 y^6 + \ldots$$

wherein a direction of an optical axis is taken as an x axis, a direction perpendicular to the optical axis is taken as a y axis, a reference symbol r represents a radius of curvature of a reference sphere, and reference symbols K, $A_2$, $A_4$, $A_6$, . . . denote aspherical surface coefficients.

Figure 9:
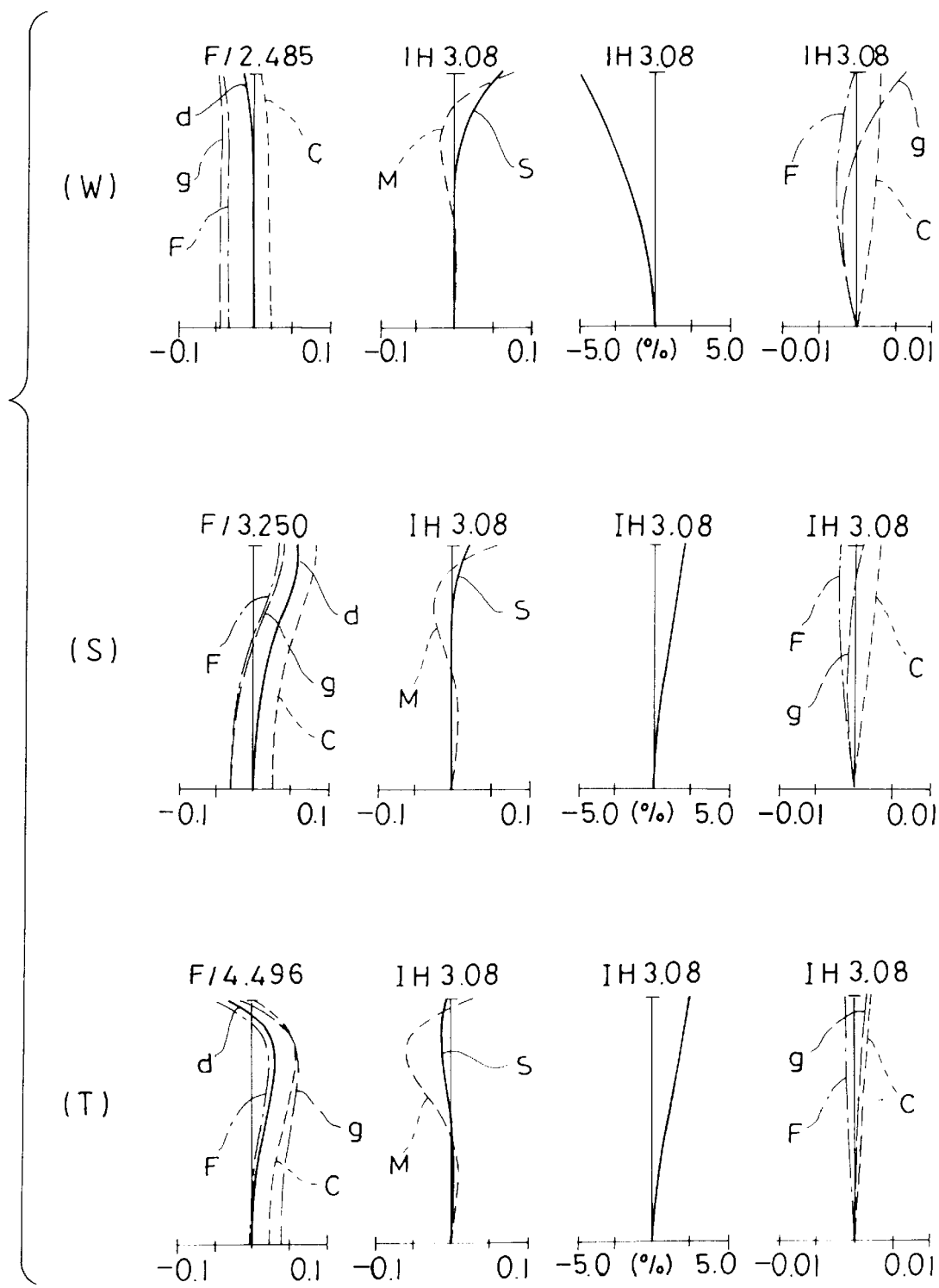
FIG. 9 shows curves visualizing aberration characteristics of the optical system according to the first embodiment in the condition where the optical system is focused on the object located at the infinite distance.

FIG. 9 shows diagrams visualizing aberration characteristics of the first embodiments. As apparent from these diagrams, the optical system according to the present invention corrects aberrations favorably and allows the aberrations to be varied little.

Furthermore, the embodiments other than the first embodiment have favorable imaging performance similarly.

The present invention makes it possible to realize a zoom optical system which is composed of a small number of lens elements, uses a simple mechanism, and is extremely thin and suited for use in an electronic image pickup apparatus.

What is claimed is:

1. A zoom optical system comprising in order from the object side:

a first lens unit having negative refractive power; a second lens unit having positive refractive power; and a third lens unit having positive refractive power, wherein said optical system is configured to change a magnification by moving at least said first lens unit and said second lens unit so as to change an airspace between said first lens unit and said second lens unit and widen an airspace between said second lens unit and said third lens unit, and wherein said second lens unit consists, in order from the object side, of a biconvex lens element and a cemented meniscus lens component having a convex surface on the object side, and satisfies the following conditions (1) and (2);

$$1.0 < -\beta 2T < 2.2 \tag{1}$$

$$1.4 < f2//fW < 2.8 \tag{2}$$

wherein a reference symbol β2T represents a lateral magnification of the second lens unit at the tele position, a reference symbol f2 designates a focal length of the second lens unit and a reference symbol fW denotes a focal length of the zoom optical system as a whole.

2. The zoom optical system according to claim 1, wherein aspherical surfaces are used on a lens element disposed on a most object side in said second lens unit and in said third lens unit.

3. The zoom optical system according to claim 1 or 2, wherein said third lens unit is moved for focusing.

4. The zoom optical system according to claim 1 or 2, wherein said cemented lens component of said second lens unit consists, in order from the object side, of a positive meniscus lens element and a negative meniscus lens element, and satisfies the following conditions (3) and (4);

$$0.05 < D(2N)/D(2) < 0.2 \tag{3}$$

$$0.2 < R(2R)/f2 < 0.5 \tag{4}$$

wherein a reference symbol D (2N) represents an axial thickness of the negative cemented meniscus lens component of the second lens unit, a reference symbol D (2) designates a length as measured from an object side surface of the biconvex lens element of the second lens unit to an image side surface of the negative meniscus lens element of the cemented lens component along an optical axis and a reference symbol R (2R) denotes a radius of curvature on a most image side surface of the second lens unit.

5. The zoom optical system according to claim 1 or 2, wherein said third lens unit is kept stationary during a magnification change.

6. The zoom optical system according to claim 1 or 2, wherein said first lens unit comprises, in order from the object side, one or two negative lens elements and a positive lens element, and wherein at least one of said negative lens elements has an aspherical surface.

7. The zoom optical system according to claim 1 or 2, wherein said third lens unit comprises at least a positive lens element, and wherein a most object side positive lens element in said second lens unit and a most object side lens element out of positive lens elements in said third lens unit satisfy the following conditions (5) and (6);

$$0.5 < \{R(21F)+R(21R)\}/\{R(21F)-R(21R)\} < 1 \tag{5}$$

$$0.5 < \{R(31F)+R(31R))\}/\{R(31F)-R(31R)\} < 3 \tag{6}$$

wherein reference symbols R (21F) and R (21R) represent radii of curvature on an object side surface and an image side surface respectively of the most object side positive lens element of the second lens unit, and reference symbols R (31F) and R (31R) designate radii of curvature on an object side surface and an image side surface respectively of a most image side positive lens element of the third lens unit.

8. The zoom optical system according to claim 1 or 2, wherein an image pickup device is disposed on an image surface side of said third lens unit and said optical system satisfies the following conditions (7) and (8):

$$0.7 < T1/Y < 1.5 \tag{7}$$

$$0.5 < T2/Y < 1.3 \tag{8}$$

wherein a reference symbol T1 represents a thickness as measured from a most object side surface to a most image side surface of the first lens unit along the optical axis, a reference symbol T2 designates a thickness as measured form a most object side surface of the positive biconvex lens element of the second lens unit to a most image side surface of the cemented lens component of the second lens unit along the optical axis and a reference symbol Y denotes a diagonal length of an effective image pickup area of the image pickup device.

9. The zoom optical system according to claim 1 or 2, wherein an image pickup device is disposed on an image surface side of said third lens unit, and said optical system comprises, on the object side of said image pickup device, a near infrared sharp cut coat which has transmittance of 80% or higher for a ray having a wavelength of 600 nm and transmittance of 10% or lower for a ray having a wavelength of 700 nm.

10. The zoom optical system according to claim 1 or 2 comprising: an image pickup device disposed on an image surface side of said third lens unit; and a complementary color mosaic filter which is disposed on the object side of said image pickup device and consists of complementary filters arranged in mosaic.

11. The zoom optical system according to claim 1 or 2, comprising:

an image pickup device disposed on an image surface side of said third lens unit; and an optical low pass filter which is disposed on the object side of said image pickup device and satisfied the following condition (9):

$$0.15p \times 10^3 < T(LPF) < 0.45p \times 10^3 \tag{9}$$

wherein a reference symbol p represents a horizontal pitch of picture elements on the image pickup device and a reference symbol T(LPF) designates a thickness of the optical low pass filter as a whole.

12. The optical low pass optical system according to claim 11, wherein said optical low pass filter is composed by overlapping a plurality of optical low pass filters.

13. The zoom optical system according to claim 11, wherein said optical low pass filter is composed by overlapping three optical low pass filters.

14. A zoom optical system comprising in order from the object side:

a first lens unit having negative refractive power; a second lens unit having positive refractive power; and a third lens unit having positive refractive power, wherein said optical system is configured to change a magnification by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2) and wherein said third lens unit is moved for focusing:

$$1.0 < -\beta 2T < 2.2 \tag{1}$$

$$1.4 < f2/fw < 2.8 \tag{2}$$

wherein a reference symbol β2T represents a lateral magnification of the second lens unit at the tele position, a reference symbol f2 designates a focal length of the second lens unit and a reference symbol fW denotes a focal length of the zoom optical system as a whole.

15. A zoom optical system comprising in order from the object side:

a first lens unit having negative refractive power; a second lens unit having positive refractive power; and a third lens unit having positive refractive power, wherein said optical system is configured to change a magnification by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and wherein said cemented lens component of said second lens unit consists, in order from the object side, of a positive meniscus lens element and a negative meniscus lens element, and satisfies the following conditions (1), (2), (3) and (4):

$$1.0 < -\beta 2T < 2.2 \tag{1}$$

$$1.4 < f2/fw < 2.8 \tag{2}$$

$$0.05 < D\,(2N)/D\,(2) < 0.2 \tag{3}$$

$$0.2 < R\,(2R)/f2 < 0.5 \tag{4}$$

wherein a reference symbol $\beta 2T$ represents a lateral magnification of the second lens unit at the tele position, a reference symbol f2 designates a focal length of the second lens unit, a reference symbol fW denotes a focal length of the zoom optical system as a whole, a reference symbol p (2N) represents an axial thickness of the negative cemented meniscus lens component of the second lens unit, a reference symbol D (2) designates a length as measured from an object side surface of the biconvex lens element of the second lens unit to an image side surface of the negative meniscus lens element of the cemented lens component along an optical axis and a reference symbol R (2R) denotes a radius of curvature on a most image side surface of the second lens unit.

16. A zoom optical system comprising in order from the object side:

a first lens unit having negative refractive power; and second lens unit having positive refractive power; and a third lens unit having positive refractive power, wherein said optical system is configured to change a magnification by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2), and wherein said third lens unit comprises at least a positive lens element, and wherein a most object side positive lens element in said second lens unit and a most object side lens element out of positive lens elements in said third lens unit satisfy the following conditions (5) and (6);

$$1.0 < -\beta 2T < 2.2 \tag{1}$$

$$1.4 < f2/fw < 2.8 \tag{2}$$

$$0.5 < \{R(21P) + R(21R)\}/\{R(21F) - R(21R)\} < 1 \tag{5}$$

$$0.5 < \{R(31F) + R(31R)\}/\{R(31F) - R(31R)\} < 3 \tag{6}$$

wherein a reference symbol $\beta 2T$ represents a lateral magnification of the second lens unit at the tele position, a reference symbol f2 designates a focal length of the second lens unit, a reference symbol fW denotes a focal length of the zoom optical system as a whole, reference symbols R (21F) and R (21R) represent radius of curvature on an object side surface and an image side surface respectively of the most object side positive lens element of the second lens unit, and reference symbols R (31F) and R (31R) designate radii of curvature on an object side surface and an image side surface respectively of a most image side positive lens element of the third lens unit.

17. A zoom optical system comprising in order from the object side:

a first lens unit having negative refractive power; a second lens unit having positive refractive power; and a third lens unit having positive refractive power, wherein said optical system is configured to change a magnification by moving at least said fist lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2), and wherein an image pickup device is disposed on an image surface side of said third lens unit and said optical system satisfies as the following conditions (7) and (8):

$$1.0 < -\beta 2T < 2.2 \tag{1}$$

$$1.4 < f2/fw < 2.8 \tag{2}$$

$$0.7 < T1/Y < 1.5 \tag{7}$$

$$0.5 < T2/Y < 1.3 \tag{8}$$

wherein a reference symbol $\beta 2T$ represents a lateral magnification of the second lens unit at the tele position, a reference symbol f2 designates a focal length of the second lens unit, a reference symbol fW denotes a focal length of the zoom optical system as a whole, a reference symbol T1 represents a thickness as measured from a most object side surface to a most image side surface of the first lens unit along the optical axis, a reference symbol T2 designates a thickness as measured form a most object side surface of the positive biconvex lens element of the second lens unit to a most image side surface of the cemented lens component of the second lens unit along the optical axis and a reference symbol Y denotes a diagonal length of an effective image pickup area of the image pickup device.

18. A zoom optical system comprising in order from the object side:

a first lens unit having negative refractive power; a second lens unit having positive refractive power; and a third lens unit having positive refractive power, wherein said optical system is configured to change a magnification by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2), and wherein an image pickup device is disposed on an image surface side of said third lens unit, and said optical system comprises, on the object side of said image pickup device, a near infrared sharp cut coat which has transmittance of 80% or higher for a ray having a wavelength of 600 nm and transmittance of 10% or lower for a ray having a wavelength of 700 nm;

$$1.0 < -\beta 2T < 2.2 \qquad (1)$$

$$1.4 < f2/fw < 2.8 \qquad (2)$$

wherein a reference symbol β2T represents a lateral magnification of the second lens unit at the tele position, a reference symbol f2 designates a focal length of the second lens unit and a reference symbol fW denotes a focal length of the zoom optical system as a whole.

19. A zoom optical system comprising in order from the object side:

a first lens unit having negative refractive power; a second lens unit having positive refractive power; and a third lens unit having positive refractive power, wherein said optical system is configured to change a magnification by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2), and wherein said zoom optical system comprises:

an image pickup device disposed on an image surface side of said third lens unit; and a complementary color mosaic filter which is disposed on the object side of said image pickup device and consists of complementary filters arranged in mosaic;

$$1.0 < -\beta 2T < 2.2 \qquad (1)$$

$$1.4 < f2/fw < 2.8 \qquad (2)$$

wherein a reference symbol β2T represents a lateral magnification of the second lens unit at the tele position, a reference symbol f2 designates a focal length of the second lens unit and a reference symbol fW denotes a focal length of the zoom optical system as a whole.

20. A zoom optical system comprising in order from the object side:

a first lens unit having negative refractive power; a second lens unit having positive refractive power; and a third lens unit having positive refractive power, wherein said optical system is configured to change a magnification by moving at least said first lens unit and said second lens unit so as to change an airspace between said first lens unit and said second lens unit and widen an airspace between said second lens unit and said third lens unit, and wherein said second lens unit comprises, in order from the object side, a biconvex lens element and a cemented meniscus lens component having a convex surface on the object side, and satisfies the following conditions (1) and (2), and wherein said zoom optical system comprises an image pickup device disposed on an image surface side of said third lens unit, and an optical low pass filter which is disposed on the object side of said image pickup device and satisfies the following condition (9):

$$1.0 < -\beta 2T < 2.2 \qquad (1)$$

$$1.4 < f2/fw < 2.8 \qquad (2)$$

$$0.15 p \times 10^3 < T(LPF) \times 0.45 p \times 10^3 \qquad (9)$$

wherein a reference symbol β2T represents a lateral magnification of the second lens unit at the tele position, a reference symbol f2 designates a focal length of the second lens unit, a reference symbol fW denotes a focal length of the zoom optical system as a whole and a reference symbol p represents a horizontal pitch of picture elements on the image pickup device and a reference symbol T(LPF) designates a thickness of the optical low pass filter as a whole.

21. The optical low pass optical system according to claim 20, wherein said optical low pass filter is composed by overlapping a plurality of optical low pass filters.

22. The zoom optical system according to claim 20, wherein said optical low pass filter is composed by overlapping three optical low pass filters.

23. The zoom optical system according to claim 14, 15, 16, 17, 18, 19 and 20, wherein aspherical surfaces are used on a lens element disposed on a most object side in said second lens unit and in said third lens unit.

24. A zoom optical system comprising in order from the object side:

a first lens unit having negative refractive power; a second lens unit having positive refractive power; and a third lens unit having positive refractive power, wherein said optical system is configured to change a magnification by moving at least said first lens unit and said second lens unit so as to change an airspace between said first lens unit and said second lens unit and widen an airspace between said second lens unit and said third lens unit, and wherein said second lens unit consists of, in order from the object side, a biconvex lens element and a cemented meniscus lens component having a convex surface on the object side, and said cemented meniscus lens component having cemented surface shaped convex toward the object side and satisfies the following conditions (1) and (2);

$$1.0 < -\beta 2T < 2.2 \qquad (1)$$

$$1.4 < f2/fw < 2.8 \qquad (2)$$

wherein a reference symbol β2T represents a lateral magnification of the second lens unit at the tele position, a reference symbol f2 designates a focal length of the second lens unit and a reference symbol fW denotes a focal length of the zoom optical system as a whole.

\* \* \* \* \*

UNITED STATES PATENT AND TRADEMARK OFFICE
CERTIFICATE OF CORRECTION

PATENT NO. : 6,515,804 B2
DATED : February 4, 2003
INVENTOR(S) : Watanabe et al.

It is certified that error appears in the above-identified patent and that said Letters Patent is hereby corrected as shown below:

Column 16,
Line 51, after "magnification" insert -- from a wide position to a tele position --;

Column 17,
Line 4, after "whole" insert -- at the wide position --.

Column 18,
Line 46, after "magnification" insert -- from a wide position to a tele position --;
Line 67, after "whole" insert -- at the wide position --.

Column 19,
Lines 6 and 48, after "magnification" insert -- from a wide position to a tele position --;
Line 22, change "1.4<f2/fw2.8 (2)" to -- 1.4<fw<2.8 (2) --;
Line 32, after "whole" insert -- at the wide position --.

Line 66, change "0.5<{R(21P)+R(21R)}/{R(21F)-R(21R)}<1 (5)" to
 --0.5<{R(21F)+R(21R)}/{R(21F)-R(21R)}<1 (5)--;

Column 20,
Lines 6 and 46, after "whole" insert -- at the wide position --.
Line 19, after "magnification" insert -- from a wide position to a tele position --;
Line 61, after "magnification" insert -- from a wide position to a tele position. --;

Column 21,
Lines 20 and 52, after "whole" insert -- at the wide position --.
Lines 27 and 58, after "magnification" insert -- from a wide position to a tele position --;

Column 22,
Lines 21 and 62, after "whole" insert -- at the wide position --.
Line 40, after "magnification" insert -- from a wide position to a tele position --.

UNITED STATES PATENT AND TRADEMARK OFFICE
CERTIFICATE OF CORRECTION

PATENT NO. : 6,515,804 B2
DATED : February 4, 2003
INVENTOR(S) : Watanabe et al.

It is certified that error appears in the above-identified patent and that said Letters Patent is hereby corrected as shown below:

Columns 16 to 22,
The claims should read:

1. A zoom optical system comprising in order from the object side:

a first lens unit having negative refractive power; a second lens unit having positive refractive power; and a third lens unit having positive refractive power, wherein said optical system is configured to change a magnification from a wide position to a tele position by moving at least said first lens unit and said second lens unit so as to change an airspace between said first lens unit and said second lens unit and widen an airspace between said second lens unit and said third lens unit, and wherein said second lens unit consists, in order from the object side, of a biconvex lens element and a cemented meniscus lens component having a convex surface on the object side, and satisfies the following conditions (1) and (2);

$1.0 < -\beta 2T < 2.2$ (1)

$1.4 < f2/fW < 2.8$ (2)

wherein a reference symbol $\beta 2T$ represents a lateral magnification of the second lens unit at the tele position, a reference symbol $f2$ designates a focal length of the second lens unit and a reference symbol $fW$ denotes a focal length of the zoom optical system as a whole at the wide position.

2. The zoom optical system according to claim 1, wherein aspherical surfaces are used on a lens element disposed on a most object side in said second lens unit and in said third lens unit.

3. The zoom optical system according to claim 1 or 2, wherein said third lens unit is moved for focusing.

4. The zoom optical system according to claim 1 or 2, wherein said cemented lens component of said second lens unit consists, in order from the object side, of a positive meniscus lens element and a negative meniscus lens element, and satisfies the following conditions (3) and (4);

$0.05 < D(2N)/D(2) < 0.2$ (3)

$0.2 < R(2R)/f2 < 0.5$ (4)

wherein a reference symbol $D(2N)$ represents an axial thickness of the negative cemented meniscus lens component of the second lens unit, a reference symbol $D(2)$ designates a length as measured from an object side surface of the biconvex lens element of the second lens unit to an image side surface of the negative meniscus lens element of the cemented lens component along an optical axis and a reference symbol $R(2R)$ denotes a radius of curvature on a most image side surface of the second lens unit.

5. The zoom optical system according to claim 1 or 2, wherein said third lens unit is kept stationary during a magnification change.

6. The zoom optical system according to claim 1 or 2, wherein said first lens unit comprises, in order from the object side, one or two negative lens elements and a positive lens element, and wherein at least one of said negative lens elements has an aspherical surface.

7. The zoom optical system according to claim 1 or 2, wherein said third lens unit comprises at least a positive lens element, and wherein a most object side positive lens element in said second lens unit and a most object side lens element out of positive lens elements in said third lens unit satisfy the following conditions (5) and (6);

$0.5 < \{R(21F)+R(21R)\}/\{R(21F)-R(21R)\} < 1$ (5)

$0.5 < \{R(31F)+R(31R)\}/\{R(31F)-R(31R)\} < 3$ (6)

˙ierein reference symbols $R(21F)$ and $R(21R)$ represent radii of curvature on an object side surface and an image side surface respectively of the most object side positive lens element of the

UNITED STATES PATENT AND TRADEMARK OFFICE
CERTIFICATE OF CORRECTION

PATENT NO. : 6,515,804 B2
DATED : February 4, 2003
INVENTOR(S) : Watanabe et al.

It is certified that error appears in the above-identified patent and that said Letters Patent is hereby corrected as shown below:

second lens unit, and reference symbols R (31F) and R (31R) designate radii of curvature on an object side surface and an image side surface respectively of a most image side positive lens element of the third lens unit.

8. The zoom optical system according to claim 1 or 2, wherein an image pickup device is disposed on an image surface side of said third lens unit and said optical system satisfies the following conditions (7) and (8):

$0.7 < T1/Y < 1.5$ (7)

$0.5 < T2/Y < 1.3$ (8)

wherein a reference symbol T1 represents a thickness as measured from a most object side surface to a most image side surface of the first lens unit along the optical axis, a reference symbol T2 designates a thickness as measured form a most object side surface of the positive biconvex lens element of the second lens unit to a most image side surface of the cemented lens component of the second lens unit along the optical axis and a reference symbol Y denotes a diagonal length of an effective image pickup area of the image pickup device.

9. The zoom optical system according to claim 1 or 2, wherein an image pickup device is disposed on an image surface side of said third lens unit, and said optical system comprises, on the object side of said image pickup device, a near infrared sharp cut coat which has transmittance of 80% or higher for a ray having a wavelength of 600 nm and transmittance of 10% or lower for a ray having a wavelength of 700 nm.

10. The zoom optical system according to claim 1 or 2 comprising: an image pickup device disposed on an image surface side of said third lens unit; and a complementary color mosaic filter which is disposed on the object side of said image pickup device and consists of complementary filters arranged in mosaic.

11. The zoom optical system according to claim 1 or 2, comprising:

an image pickup device disposed on an image surface side of said third lens unit; and an optical low pass filter which is disposed on the object side of said image pickup device and satisfied the following condition (9):

$0.15 p \times 10^3 < T(LPF) < 0.45 p \times 10^3$ (9)

wherein a reference symbol p represents a horizontal pitch of picture elements on the image pickup device and a reference symbol T(LPF) designates a thickness of the optical low pass filter as a whole.

12. The optical low pass optical system according to claim 11, wherein said optical low pass filter is

UNITED STATES PATENT AND TRADEMARK OFFICE
CERTIFICATE OF CORRECTION

PATENT NO. : 6,515,804 B2
DATED : February 4, 2003
INVENTOR(S) : Watanabe et al.

It is certified that error appears in the above-identified patent and that said Letters Patent is hereby corrected as shown below:

composed by overlapping a plurality of optical low pass filters.

13. The zoom optical system according to claim 11, wherein said optical low pass filter is composed by overlapping three optical low pass filters.

14. A zoom optical system comprising in order from the object side:

a first lens unit having negative refractive power; a second lens unit having positive refractive power; and a third lens unit having positive refractive power, wherein said optical system is configured to change a magnification from a wide position to a tele position by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2) and wherein said third lens unit is moved for focusing:

$1.0 < -\beta 2T < 2.2$ (1)

$1.4 < f2/fw < 2.8$ (2)

wherein a reference symbol $\beta 2T$ represents a lateral magnification of the second lens unit at the tele position, a reference symbol f2 designates a focal length of the second lens unit and a reference symbol fW denotes a focal length of the zoom optical system as a whole at the inside position.

15. A zoom optical system comprising in order from the object side:

a first lens unit having negative refractive power; a second lens unit having positive refractive power; and a third lens unit having positive refractive power, wherein said optical system is configured to change a magnification from a wide position to a tele position by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and wherein said cemented lens component of said second lens unit consists, in order from the object side, of a positive meniscus lens element and a negative meniscus lens element, and satisfies the following conditions (1), (2), (3) and (4):

$1.0 < -\beta 2T < 2.2$ (1)

[[$1.4 < f2/fw 2.8$ (2)]] $1.4 < f2/fw < 2.8$ (2)

$0.05 < D(2N)/D(2) < 0.2$ (3)

UNITED STATES PATENT AND TRADEMARK OFFICE
CERTIFICATE OF CORRECTION

PATENT NO. : 6,515,804 B2
DATED : February 4, 2003
INVENTOR(S) : Watanabe et al.

It is certified that error appears in the above-identified patent and that said Letters Patent is hereby corrected as shown below:

$0.2 < R(2R)/f2 < 0.5$ (4)

wherein a reference symbol $\beta 2T$ represents a lateral magnification of the second lens unit at the tele position, a reference symbol f2 designates a focal length of the second lens unit, a reference symbol fW denotes a focal length of the zoom optical system as a whole at the wide position, a reference symbol p (2N) represents an axial thickness of the negative cemented meniscus lens component of the second lens unit, a reference symbol D (2) designates a length as measured from an object side surface of the biconvex lens element of the second lens unit to an image side surface of the negative meniscus lens element of the cemented lens component along an optical axis and a reference symbol R (2R) denotes a radius of curvature on a most image side surface of the second lens unit.

16. A zoom optical system comprising in order from the object side:

a first lens unit having negative refractive power; and second lens unit having positive refractive power; and a third lens unit having positive refractive power, wherein said optical system is configured to change a magnification from a wide position to a tele position by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2), and wherein said third lens unit comprises at least a positive lens element, and wherein a most object side positive lens element in said second lens unit and a most object side lens element out of positive lens elements in said third lens unit satisfy the following conditions (5) and (6);

$1.0 < \beta 2T < 2.2$ (1)

$1.4 < f2/fw < 2.8$ (2)

[[$0.5 < \{R(21P)+R(21R)\}/\{R(21F)-R(21R)\} < 1$ (5)]]

$\underline{0}.5 < \{R(21F)+R(21R)\}/\{R(21F)-R(21R)\} < 1$ (5).

$0.5 < \{R(31F)+R(31R)\}/\{R(31F)-R(31R)\} < 3$ (6)

wherein a reference symbol $\beta 2T$ represents a lateral magnification of the second lens unit at the tele position, a reference symbol f2 designates a focal length of the second lens unit, a reference symbol fW denotes a focal length of the zoom optical system as a whole <u>at the wide position</u>, reference symbols R (21F) and R (21R) represent radius of curvature on an object side surface and an image side surface respectively of the most object side positive lens element of the second lens unit, and reference symbols R (31F) and R (31R) designate radii of curvature on an object side surface and an image side surface respectively of a most image side positive lens element of the third lens unit.

UNITED STATES PATENT AND TRADEMARK OFFICE
CERTIFICATE OF CORRECTION

PATENT NO.      : 6,515,804 B2
DATED           : February 4, 2003
INVENTOR(S)     : Watanabe et al.

It is certified that error appears in the above-identified patent and that said Letters Patent is hereby corrected as shown below:

17. A zoom optical system comprising in order from the object side:

a first lens unit having negative refractive power; a second lens unit having positive refractive power; and a third lens unit having positive refractive power, wherein said optical system is configured to change a magnification from a wide position to a tele position by moving at least said fist lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2), and wherein an image pickup device is disposed on an image surface side of said third lens unit and said optical system satisfies as the following conditions (7) and (8):

$1.0 < -\beta_{2T} < 2.2$ (1)

$1.4 < f_2/f_W < 2.8$ (2)

$0.7 < T_1/Y < 1.5$ (7)

$0.5 < T_2/Y < 1.3$ (8)

wherein a reference symbol $\beta_{2T}$ represents a lateral magnification of the second lens unit at the tele position, a reference symbol $f_2$ designates a focal length of the second lens unit, a reference symbol $f_W$ denotes a focal length of the zoom optical system as a whole at the wide position, a reference symbol $T_1$ represents a thickness as measured from a most object side surface to a most image side surface of the first lens unit along the optical axis, a reference symbol $T_2$ designates a thickness as measured form a most object side surface of the positive biconvex lens element of the second lens unit to a most image side surface of the cemented lens component of the second lens unit along the optical axis and a reference symbol $Y$ denotes a diagonal length of an effective image pickup area of the image pickup device.

18. A zoom optical system comprising in order from the object side:

a first lens unit having negative refractive power; a second lens unit having positive refractive power; and a third lens unit having positive refractive power, wherein said optical system is configured to change a magnification from a wide position to a tele position by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2), and wherein an image pickup device is disposed on an image surface side of said third lens unit, and said optical system comprises, on the object side of said image pickup device, a near infrared sharp cut coat which has transmittance of 80% or higher for a

UNITED STATES PATENT AND TRADEMARK OFFICE
CERTIFICATE OF CORRECTION

PATENT NO.      : 6,515,804 B2
DATED           : February 4, 2003
INVENTOR(S)     : Watanabe et al.

It is certified that error appears in the above-identified patent and that said Letters Patent is hereby corrected as shown below:

ray having a wavelength of 600 nm and transmittance of 10% or lower for a ray having a wavelength of 700 nm;

$1.0 < -\beta 2T < 2.2$ (1)

$1.4 < f2/fw < 2.8$ (2)

wherein a reference symbol $\beta 2T$ represents a lateral magnification of the second lens unit at the tele position, a reference symbol f2 designates a focal length of the second lens unit and a reference symbol fW denotes a focal length of the zoom optical system as a whole at the wide position.

19. A zoom optical system comprising in order from the object side:

a first lens unit having negative refractive power; a second lens unit having positive refractive power; and a third lens unit having positive refractive power, wherein said optical system is configured to change a magnification from a wide position to a tele position by moving at least said first lens unit and said second lens unit so as to change an airspace between said first lens unit and said second lens unit and widen an airspace between said second lens unit and said third lens unit, wherein said second lens unit comprises, in order from the object side, a biconvex lens element and a cemented meniscus lens component having a convex surface on the object side, and satisfies the following conditions (1) and (2), and wherein said zoom optical system comprises:

an image pickup device disposed on an image surface side of said third lens unit; and a complementary color mosaic filter which is disposed on the object side of said image pickup device and consists of complementary filters arranged in mosaic;

$1.0 < -\beta 2T < 2.2$ (1)

$1.4 < f2/fw < 2.8$ (2)

wherein a reference symbol $\beta 2T$ represents a lateral magnification of the second lens unit at the tele position, a reference symbol f2 designates a focal length of the second lens unit and a reference symbol fW denotes a focal length of the zoom optical system as a whole at the wide position.

20. A zoom optical system comprising in order from the object side:

a first lens unit having negative refractive power; a second lens unit having positive refractive power; and a third lens unit having positive refractive power, wherein said optical system is configured to change a magnification from a wide position to a tele position by moving at least said first lens unit and said second lens unit so as to change an airspace between said first lens unit and said second lens unit and widen an airspace between said second lens unit and said third lens unit, and wherein said second lens unit comprises, in order from the object side, a biconvex lens element and a cemented meniscus lens component having a convex surface on the object side, and satisfies

UNITED STATES PATENT AND TRADEMARK OFFICE
CERTIFICATE OF CORRECTION

PATENT NO. : 6,515,804 B2
DATED : February 4, 2003
INVENTOR(S) : Watanabe et al.

It is certified that error appears in the above-identified patent and that said Letters Patent is hereby corrected as shown below:

the following conditions (1) and (2), and wherein said zoom optical system comprises an image pickup device disposed on an image surface side of said third lens unit, and an optical low pass filter which is disposed on the object side of said image pickup device and satisfies the following condition (9):

$1.0 < -\beta 2T < 2.2$ (1)

$1.4 < f2/fw < 2.8$ (2)

$0.15 \times 10^3 < T(LPF) \times 0.45p \times 10^3$ (9)

wherein a reference symbol $\beta 2T$ represents a lateral magnification of the second lens unit at the tele position, a reference symbol f2 designates a focal length of the second lens unit, a reference symbol fW denotes a focal length of the zoom optical system as a whole and a reference symbol p represents a horizontal pitch of picture elements on the image pickup device and a reference symbol T(LPF) designates a thickness of the optical low pass filter as a whole at the wide position.

21. The optical low pass optical system according to claim 20, wherein said optical low pass filter is composed by overlapping a plurality of optical low pass filters.

22. The zoom optical system according to claim 20, wherein said optical low pass filter is composed by overlapping three optical low pass filters.

23. The zoom optical system according to claim 14, 15, 16, 17, 18, 19 and 20, wherein aspherical surfaces are used on a lens element disposed on a most object side in said second lens unit and in said third lens unit.

24. A zoom optical system comprising in order from the object side:

a first lens unit having negative refractive power; a second lens unit having positive refractive power; and a third lens unit having positive refractive power, wherein said optical system is configured to change a magnification from a wide position to a tele position by moving at least said first lens unit and said second lens unit so as to change an airspace between said first lens unit and said second lens unit and widen an airspace between said second lens unit and said third lens unit, and wherein said second lens unit consists of, in order from the object side, a biconvex lens element and a cemented meniscus lens component having a convex surface on the object side, and said cemented meniscus lens component having cemented surface shaped convex toward the object side and satisfies the following conditions (1) and (2);

$1.0 < -\beta 2T < 2.2$ (1)

$1.4 < f2/fw < 2.8$ (2)

UNITED STATES PATENT AND TRADEMARK OFFICE
CERTIFICATE OF CORRECTION

PATENT NO. : 6,515,804 B2
DATED : February 4, 2003
INVENTOR(S) : Watanabe et al.

It is certified that error appears in the above-identified patent and that said Letters Patent is hereby corrected as shown below:

wherein a reference symbol β2T represents a lateral magnification of the second lens unit at the tele position, a reference symbol f2 designates a focal length of the second lens unit and a reference symbol fW denotes a focal length of the zoom optical system as a whole at the wide position.

Signed and Sealed this

Sixth Day of July, 2004

JON W. DUDAS
*Acting Director of the United States Patent and Trademark Office*